(12) United States Patent  
Hanakawa et al.

(10) Patent No.: US 6,902,055 B2  
(45) Date of Patent: Jun. 7, 2005

(54) DISK CARTRIDGE

(75) Inventors: Eiichi Hanakawa, Souraku-gun (JP); Akira Kurozuka, Fujiidera (JP); Tohru Nakamura, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 77 days.

(21) Appl. No.: 10/428,867

(22) Filed: May 1, 2003

(65) Prior Publication Data

US 2003/0214754 A1 Nov. 20, 2003

(30) Foreign Application Priority Data

May 7, 2002 (JP) ........................................ 2002-131895

(51) Int. Cl.[7] ............................................. B65D 85/57
(52) U.S. Cl. ................................... 206/308.1; 312/9.58
(58) Field of Search ............................. 206/307, 307.1, 206/308.1, 309; 211/40; 312/9.1, 9.47, 9.48, 9.53, 9.54–9.58; 369/30.68

(56) References Cited

U.S. PATENT DOCUMENTS

| | | | | |
|---|---|---|---|---|
| 4,519,500 A | * | 5/1985 | Perchak | ...................... 206/309 |
| 5,746,314 A | * | 5/1998 | Knutsen et al. | .......... 206/308.1 |
| 5,936,935 A | | 8/1999 | Hanakawa et al. | |
| 5,954,197 A | * | 9/1999 | Ditzig et al. | ............. 206/308.1 |
| 5,988,374 A | * | 11/1999 | Funawatari et al. | ..... 206/308.1 |
| 6,024,214 A | * | 2/2000 | Cowan | ..................... 206/308.1 |
| 2002/0125200 A1 | * | 9/2002 | Skinner et al. | ............... 211/40 |

FOREIGN PATENT DOCUMENTS

JP 7-226045 8/1995

* cited by examiner

Primary Examiner—Luan K. Bui  
(74) Attorney, Agent, or Firm—Merchant & Gould P.C.

(57) ABSTRACT

A disk cartridge includes a substantially box-shaped outer case that has an opening on one end face, and an inner case that is housed in the outer case such that the inner case can be pulled out and has a concave portion for an optical disk to be placed therein. In an end portion on a side of the opening of each of an upper side plate and a lower side plate of the outer case, a substantially V-shaped cutout formed by a substantially circular arc and an inclined substantially straight line is formed. In the inner case, a substantially U-shaped cutout formed by a substantially circular arc and two inclined substantially straight lines is formed. The substantially straight line forming the substantially V-shaped cutout and the two substantially straight lines forming the substantially U-shaped cutout are virtually parallel to each other. The inner case further includes a cover that is opposed to a bottom face of the concave portion and fitted in the substantially V-shaped cutout when the inner case is housed in the outer case. Thus, a disk cartridge can be provided that allows a size reduction of a drive into which a single disk cartridge is loaded, and also can be used suitably in a changer drive.

10 Claims, 18 Drawing Sheets

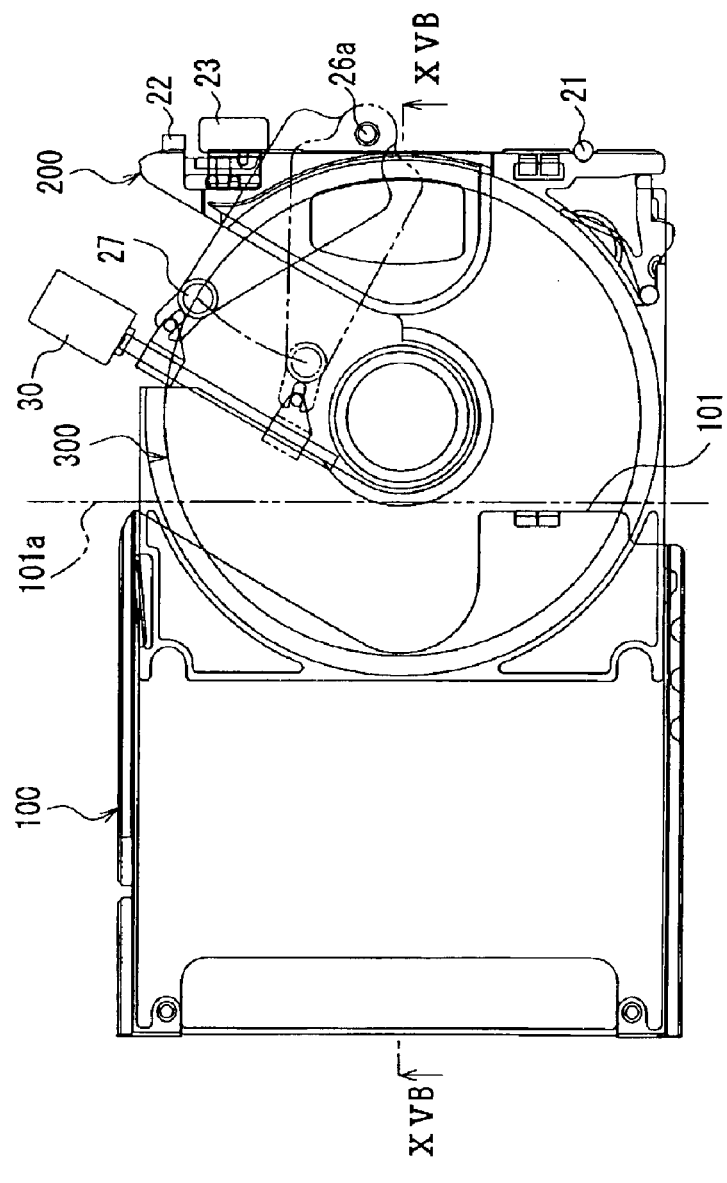
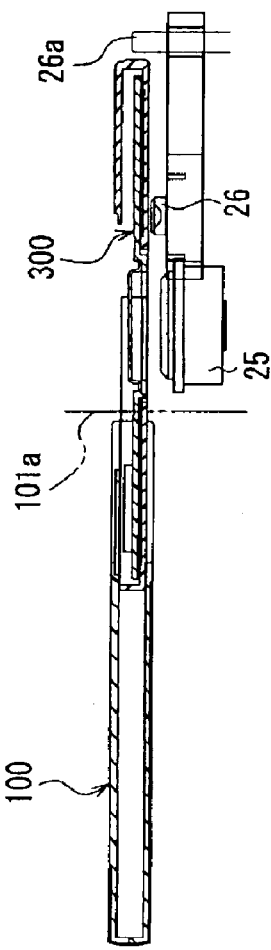
FIG. 15A
FIG. 15B

DISK CARTRIDGE

BACKGROUND OF THE INVENTION

1. Field of the Invention

The present invention relates to a disk cartridge for housing an optical disk.

2. Related Background Art

Optical disks are required to be maintained always in a clean state so that recording and/or reproduction can be performed reliably. In order to prevent the adhesion of fingerprints from the touch of a finger, the occurrence of a flaw or the adhesion of dust, an optical disk is loaded into a drive for performing information recording and/or reproduction while housed in a disk cartridge. Generally, such disk cartridges are of a shutter type that includes a shutter for opening/closing windows into which an optical head, a turntable and a magnetic head are inserted. In the case where a shutter type disk cartridge is used in a changer drive, it is required that the disk cartridge housed in a stacker be conveyed from the stacker to a drive unit by a conveying means. This requires space in which the disk cartridge is moved, which has been a hindrance to higher-speed operation and size reduction.

JP 7(1995)-226045 A and the specification of U.S. Pat. No. 5,936,935 describe known examples of a conventional disk cartridge adapted to the use in compact changer drives that achieve higher-speed operation. These examples are the inventions made by the inventors of the present invention. The present invention was made to improve these examples further in terms of size reduction and optimization.

FIGS. 19A to 19E and FIGS. 20A and 20B show a configuration of a conventional disk cartridge that is applicable to the use in compact changer drives that achieve higher-speed operation. FIGS. 19A to 19E are external views of a disk cartridge 900 in a state of housing an optical disk. FIGS. 19A, 19B and 19C are a plan view, a side view, and a back face view, respectively. FIGS. 19D and 19E are a side view of a rear portion and a side view of a front portion, respectively. Further, FIGS. 20A and 20B show a state where the optical disk is pulled out together with an inner case to such a degree that recording and/or reproduction can be performed. FIG. 20A is a sectional plan view, and FIG. 20B is a sectional side view. FIG. 20B also shows a spindle motor, an optical head, a magnetic head and the like that are used to perform recording and/or reproduction.

As shown in FIGS. 20A and 20B, the disk cartridge 900 includes an outer case that is composed of a lower case half 902 and an upper case half 903, an inner case 904 that is housed in a space within the outer case such that the inner case 904 is allowed to come in and out, and a locking member 905 for preventing the inner case 904 housed in the outer case from being pulled out unintentionally.

An optical disk 901 is placed in a circular concave portion 904a of the inner case 904. The concave portion 904a is set to have an inner diameter somewhat larger than an outer diameter of the optical disk 901 so that the optical disk 901 can be rotated in the concave portion 904a. Projections 904i projecting in a central direction are formed in an upper portion of a peripheral wall of the concave portion 904a. The projections 904i function to prevent the optical disk 901 from coming out of the concave portion 904a.

A pair of the locking members 905 are disposed on both sides of a front end of the inner case 904 in a pull-out direction. When the inner case 904 is housed in the outer case, a convex portion 905a of each of the locking members 905 is fitted in a concave portion (not shown) that is formed on an inner side wall of the outer case, thereby allowing the inner case 904 to be controlled so as not to be pulled out from the outer case. When the disk cartridge 900 is loaded into a drive, a pair of pull-out pins 920 that are provided in the drive are inserted respectively into a pair of U-shaped notches 904k in directions indicated by arrows 920a and subsequently moved outwardly within the notches 904k. As a result, each of the locking members 905 is rotated about a supporting shaft 905b, so that the engagement between the convex portion 905a and the concave portion of the outer case is released (that is, a lock is released). Then, the pull-out pins 920 are moved in a direction indicated by an arrow 920b, and thus the inner case 904 is pulled out from the outer case.

After that, as shown in FIG. 20B, from one side of the optical disk, a turntable 911 of a spindle motor and an optical head 913 that are provided in the drive move respectively toward the optical disk 901, and from the other side of the optical disk, a damper 912 and a magnetic head 914 move respectively toward the optical disk 901, which brings about a state for recording and/or reproduction. Although the magnetic head 914 is necessary in the case where the optical disk 901 is a magneto-optical recording medium, it is not necessary in the case where the optical disk 901 is a phase-change type recording medium, and in the case where the drive is intended for reproduction only.

In order for the above-mentioned conventional disk cartridge 900 to be brought to a state of recording and/or reproduction, as shown in FIGS. 20A and 20B, it is required that the optical disk 901 be pulled out from the outer case by not less than half the size of the optical disk 901 so that space for constituent components of the drive such as the spindle motor, the optical head and the like can be secured. This requires a drive using this disk cartridge 900 to have an increased depth dimension L.

Furthermore, the above-mentioned conventional disk cartridge 900 is intended mainly for the use in changer drives. Generally, changer drives are of a stationary type, and thus in a changer drive, an increase in the depth dimension L is tolerated. However, for the use in mobile devices such as a notebook personal computer, a PDA (personal digital assistant), a camera, a movie camera and the like, a drive is required to be reduced in size, and thus an increase in the depth dimension L of the drive is not tolerated.

In providing optimization with respect to a changer drive, in the case where it is desired that a plurality of optical disks be handled always as a set, for example, a two-disk set, desirably, a plurality of disk cartridges for housing these disks are joined to each other so as not to be separated. The above-mentioned documents describe a configuration in which a plurality of disk cartridges are joined to each other using a joining member. A reduced size of a disk cartridge requires that a joining member also be reduced in size, and an excessive size reduction of the joining member leads to difficulty in performing a joining operation.

Furthermore, the disclosures of the above-mentioned documents do not include a method of positioning the inner case 904, a write-protect identifying member and the like. Generally, in a shutter type disk cartridge in common use, as shown in FIG. 21, in many cases, positioning is performed by a method in which a reference pin provided on a drive side is inserted into a reference hole 956 provided on a flat surface of a cartridge case for housing an optical disk. However, in this method, it is required that the disk cartridge or the reference pin on the drive side be moved relative to each other in a direction perpendicular to the flat surface of the cartridge case, i.e. in a thickness direction, and thus a drive is required to have an increased height, which has been disadvantageous. Further, as shown in FIG. 21, generally, a write-protect identifying member 957 is disposed on the flat surface of the cartridge case. It is required that a switch for detecting the write-protect identifying member 957 on the drive side be moved relative to the write-protect identifying member 957 in the direction perpendicular to the flat surface of the cartridge case, i.e. in the thickness direction, and thus the same problem of requiring the drive to have an increased height has been presented. Further, with the improvements in a recording density technique, a smaller disk diameter is achieved, and thereby furthering the size reduction of disk cartridges. A further size-reduction of a disk cartridge also results in an excessive size reduction of a write-protect identifying member, and thus the write-protect identifying member cannot be operated easily by fingers, which also is disadvantageous.

SUMMARY OF THE INVENTION

A first object of the present invention is to provide a disk cartridge that allows a size reduction of a drive such as a notebook personal computer, a PDA or the like, into which a single disk cartridge is loaded, and also can be used suitably in a changer drive. Furthermore, a second object of the present invention is to provide a disk cartridge that allows joining of a plurality of disk cartridges to performed easily so that in a joined state, the disk cartridges can be loaded into a changer drive.

In order to achieve the above-mentioned objects, the present invention has the following configurations.

A first disk cartridge according to the present invention includes a substantially box-shaped outer case that has an opening on one end face, and an inner case that is housed in the outer case such that the inner case can be pulled out from the opening and has a concave portion for an optical disk to be placed therein. In an end portion on a side of the opening of each of an upper side plate and a lower side plate of the outer case, the outer case has a substantially V-shaped cutout formed by a substantially circular arc and a substantially straight line that is connected to the substantially circular arc and inclined with respect to sides of the outer case. The inner case has a substantially U-shaped cutout formed by a substantially circular arc in a central portion and two substantially straight lines virtually parallel to each other that are connected to the substantially circular arc and inclined with respect to sides of the inner case. The substantially straight line forming the substantially V-shaped cutout of the outer case and the two substantially straight lines forming the substantially U-shaped cutout of the inner case are virtually parallel to each other. The inner case further includes a cover that is opposed to a bottom face of the concave portion and fitted in the substantially V-shaped cutout formed on the upper side plate of the outer case when the inner case is housed in the outer case.

A second disk cartridge according to the present invention includes a substantially box-shaped outer case that has an opening on one end face, and an inner case that is housed in the outer case such that the inner case can be pulled out from the opening and has a concave portion for an optical disk to be placed therein. In an end portion on a side of the opening of a lower side plate of the outer case, the outer case has a substantially V-shaped cutout formed by a substantially circular arc and a substantially straight line that is connected to the substantially circular arc and inclined with respect to sides of the outer case. The inner case has a substantially U-shaped cutout formed by a substantially circular arc in a central portion and two substantially straight lines virtually parallel to each other that are connected to the substantially circular arc and inclined with respect to sides of the inner case. The substantially straight line forming the substantially V-shaped cutout of the outer case and the two substantially straight lines forming the substantially U-shaped cutout of the inner case are virtually parallel to each other. The inner case further includes a projection that is opposed to a bottom face of the concave portion and housed within the outer case when the inner case is housed in the outer case.

Furthermore, a third disk cartridge according to the present invention includes a substantially box-shaped outer case that has an opening on one end face, and an inner case that is housed in the outer case such that the inner case can be pulled out from the opening and has a concave portion for an optical disk to be placed therein. A projecting guide piece that is parallel to a pull-out direction of the inner case is provided on each side face of the outer case that is parallel to the pull-out direction of the inner case and orthogonal to a plane of the optical disk that is contained. The guide piece has two opposed faces that are substantially parallel to the plane of the optical disk. A distance between the two faces is narrower than a thickness of the outer case.

BRIEF DESCRIPTION OF THE DRAWINGS

FIG. 11B shows a state in which the inner case is pulled out from the outer case so that the optical disk is housed in the outer case by not less than half the size of the optical disk; and FIG. 11C shows a state in which the inner case is pulled out from the outer case so that the optical disk is exposed outside the outer case by not less than half the size of the optical disk.

FIG. 15A is a front view showing a state in which the disk cartridge according to Embodiment 1 of the present invention is loaded into a changer drive, and FIG. 15B is a cross sectional view taken on line XVB—XVB of FIG. 15A.

FIG. 18A shows a state in which an inner case is housed completely in an outer case; FIG. 18B shows a state in which the inner case is pulled out from the outer case so that an optical disk is housed in the outer case by not less than half the size of the optical disk; and FIG. 18C shows a state in which the inner case is pulled out from the outer case so that the optical disk is exposed outside the outer case by not less than half the size of the optical disk.

DETAILED DESCRIPTION OF THE INVENTION

Figure 1:
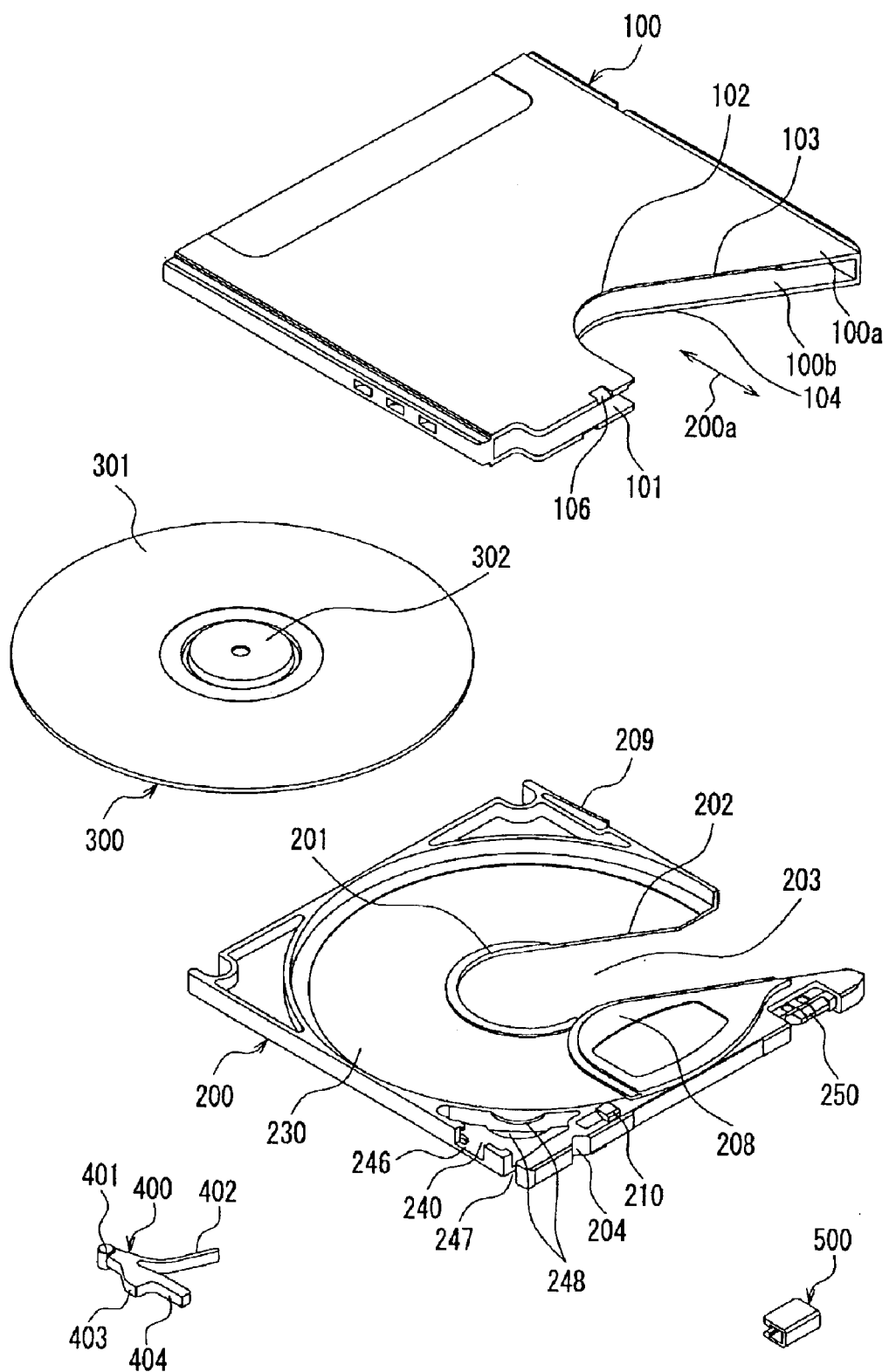
FIG. 1 is an exploded perspective view showing constituent components of a disk cartridge according to Embodiment 1 of the present invention.

A first disk cartridge according to the present invention includes a substantially box-shaped outer case that has an opening on one end face, and an inner case that is housed in the outer case such that the inner case can be pulled out from the opening and has a concave portion for an optical disk to be placed therein. In an end portion on a side of the opening of each of an upper side plate and a lower side plate of the outer case, the outer case has a substantially V-shaped cutout formed by a substantially circular arc and a substantially straight line that is connected to the substantially circular arc and inclined with respect to sides of the outer case. The inner case has a substantially U-shaped cutout formed by a substantially circular arc in a central portion and two substantially straight lines virtually parallel to each other that are connected to the substantially circular arc and inclined with respect to sides of the inner case. The substantially straight line forming the substantially V-shaped cutout of the outer case and the two substantially straight lines forming the substantially U-shaped cutout of the inner case are virtually parallel to each other. The inner case further includes a cover that is opposed to a bottom face of the concave portion and fitted in the substantially V-shaped cutout formed on the upper side plate of the outer case when the inner case is housed in the outer case.

According to this first disk cartridge, recording and/or reproduction can be performed on the optical disk contained therein while a pull-out amount of an inner case can be reduced to not more than half the diameter of the optical disk. Thus, it is possible to reduce the depth dimension of a drive of a type into which a single disk cartridge is loaded (hereinafter, referred to as a "single-disk drive") such as a drive of a notebook personal computer, a PDA or the like.

Furthermore, when the inner case is pulled out by not less than half the diameter of the optical disk, a turntable of a spindle motor, an optical head, a magnetic head, and a damper of the drive can be disposed on a pull-out direction side of the inner case with respect to an opening of an outer case, and thus it is possible to configure a changer drive in which a number of disk cartridges are arranged, and a drive unit moves in an arranging direction of the disk cartridges along the side of the disk cartridges.

Thus, the first disk cartridge according to the present invention allows a reduction in size of a single-disk drive and can be used optimally in a changer drive.

Preferably, in the above-mentioned first disk cartridge, when the inner case is pulled out from the outer case so that the substantially straight line forming the substantially V-shaped cutout of the outer case substantially coincides with one of the two substantially straight lines forming the substantially U-shaped cutout of the inner case, the substantially V-shaped cutouts, the cover and the substantially U-shaped cutout form apertures, in each of which a portion of each surface of the optical disk that is placed in the concave portion of the inner case is exposed.

According to this preferred configuration, through the apertures, a turntable of a spindle motor, an optical head, a magnetic head, and a damper of a drive can be moved toward an optical disk.

Next, a second disk cartridge according to the present invention includes a substantially box-shaped outer case that has an opening on one end face, and an inner case that is housed in the outer case such that the inner case can be pulled out from the opening and has a concave portion for an optical disk to be placed therein. In an end portion on a side of the opening of a lower side plate of the outer case, the outer case has a substantially V-shaped cutout formed by a substantially circular arc and a substantially straight line that is connected the substantially circular arc and inclined with respect to sides of the outer case. The inner case has a substantially U-shaped cutout formed by a substantially circular arc in a central portion and two substantially straight lines virtually parallel to each other that are connected to the substantially circular arc and inclined with respect to sides of the inner case. The substantially straight line forming the substantially V-shaped cutout of the outer case and the two substantially straight lines forming the substantially U-shaped cutout of the inner case are virtually parallel to each other. The inner case further includes a projection that is opposed to a bottom face of the concave portion and housed within the outer case when the inner case is housed in the outer case.

According to this second disk cartridge, recording and/or reproduction can be preformed on the optical disk contained therein while a pull-out amount of the inner case can be reduced to not more than half the diameter of the optical disk. Thus, it is possible to reduce the depth dimension of a drive of a type into which a single disk cartridge is loaded (single-disk drive) such as a drive of a notebook personal computer, a PDA or the like.

Furthermore, when the inner case is pulled out by not less than half the diameter of the optical disk, a turntable of a spindle motor and an optical head of the drive can be disposed on a pull-out direction side of the inner case with respect to an opening of an outer case, and thus it is possible to configure a changer drive in which a number of disk cartridges are arranged, and a drive unit moves in an arranging direction of the disk cartridges along the side of the disk cartridges.

Thus, the second disk cartridge according to the present invention allows a reduction in size of a single-disk drive and can be used optimally in a changer drive.

Furthermore, by reducing the size of the projection to the maximum possible extent, the inner case can be formed more easily.

Preferably, in the above-mentioned second disk cartridge, the inner case further includes a bridging portion that connects between the two substantially straight lines forming the substantially U-shaped cutout. This allows the strength of the inner case to be increased.

Furthermore, preferably, in the above-mentioned second disk cartridge, when the inner case is pulled out from the outer case so that the substantially straight line forming the substantially V-shaped cutout of the outer case substantially coincides with one of the two substantially straight lines forming the substantially U-shaped cutout of the inner case, the substantially V-shaped cutout and the substantially U-shaped cutout form an aperture in which a portion of a back surface of the optical disk that is placed in the concave portion of the inner case is exposed.

According to this preferred configuration, through the aperture, a turntable of a spindle motor and an optical head of a drive can be moved toward an optical disk.

Preferably, in each of the above-mentioned first and second disk cartridges, a spindle motor and an optical head may be inserted into one or more of the apertures.

Furthermore, preferably, in each of the above-mentioned first and second disk cartridges, a center of the substantially circular arc forming the substantially U-shaped cutout of the inner case substantially coincides with a rotation center of the optical disk that is placed in the concave portion of the inner case. According to this configuration, a turntable or a damper of a drive that holds and rotates an optical disk can chuck the optical disk through the substantially U-shaped cutout.

Furthermore, preferably, in each the above-mentioned first and second disk cartridges, the substantially circular arc forming the substantially V-shaped cutout of the outer case and the substantially circular arc forming the substantially U-shaped cutout of the inner case have a radius larger than a radius of a spindle motor for driving the optical disk to rotate. According to this configuration, a spindle motor of a drive can be moved toward an optical disk through a substantially V-shaped cutout and a substantially U-shaped cutout while a pull-out amount of an inner case can be reduced to not more than half the diameter of the optical disk.

Furthermore, preferably, in each of the above-mentioned first and second disk cartridges, a notch for positioning the inner case in a drive is provided on a front end face of the inner case in a pull-out direction from the outer case. According to this configuration, in a drive, simply by pulling out an inner case to a predetermined position, positioning of the inner case can be performed with accuracy. Thus, positioning does not require a drive or a disk cartridge to be moved in a normal direction with respect to a plane of an optical disk, thereby allowing the drive to be reduced in thickness (dimension in the normal direction of the optical disk).

Furthermore, preferably, in each of the above-mentioned first and second disk cartridges, a write-protect identifying member is provided on a front end face of the inner case in a pull-out direction from the outer case. According to this configuration, in a drive, simply by pulling out an inner case to a predetermined position, a write-protect state can be detected. Thus, the detection of write protection does not require a detection switch provided in a drive or a disk cartridge to be moved in a normal direction with respect to a plane of an optical disk, thereby allowing the drive to be reduced in thickness (dimension in the normal direction of the optical disk).

Furthermore, preferably, in each of the above-mentioned first and second disk cartridges, when the inner case is housed in the outer case, the write-protect identifying member is exposed in the substantially V-shaped cutout of the outer case. According to this configuration, even with a disk cartridge reduced in size, the operability of a write-protect identifying member can be maintained.

Furthermore, preferably, in each of the above-mentioned first and second disk cartridges, an area on which a label is attached is provided on a surface of the cover of the inner case, and information regarding a type of the optical disk that is contained is recorded on the label in the form of a bar code. According to this configuration, at a point in time when a disk cartridge is inserted into a holder of a drive or a stacker of a changer drive, that is, before an inner case is pulled out from an outer case, information regarding an optical disk that is contained can be detected. This allows disk controlling information to be detected at an earlier point in time, thereby achieving a quick start-up.

Furthermore, preferably, in each of the above-mentioned first and second disk cartridges, an engaging configuration for preventing the upper side plate and the lower side plate of the outer case from being separated from the inner case when the inner case is housed in the outer case is provided at a front end of the inner case in a pull-out direction from the outer case and near the opening of the outer case. According to this configuration, the entry of dust in the outer case can prevented, thereby maintaining a clean state of an optical disk.

Next, a third disk cartridge according to the present invention includes a substantially box-shaped outer case that has an opening on one end face, and an inner case that is housed in the outer case such that the inner case can be pulled out from the opening and has a concave portion for an optical disk to be placed therein. A projecting guide piece that is parallel to a pull-out direction of the inner case is provided on each side face of the outer case that is parallel to the pull-out direction of the inner case and orthogonal to a plane of the optical disk that is contained. The guide piece has two opposed faces that are substantially parallel to the plane of the optical disk. A distance between the two faces is narrower than a thickness of the outer case.

According to this third disk cartridge, a disk cartridge can be housed in a stacker of a changer drive such that a position of the disk cartridge is controlled with accuracy. Moreover, in a joined state, disk cartridges can be arranged in close contact with each other in a stacker of a changer drive. Therefore, it is made easier to handle a plurality of optical disks as a set. Further, a stacker of a changer drive can attain improved efficiency in housing disk cartridges.

A plurality of the above-mentioned third disk cartridges can be joined into one body in such a manner as to be overlapped in the same orientation using a double-faced adhesive tape, a glue or an adhesive. According to this configuration, even with disk cartridges reduced in size, a joining operation can be performed easily. Then, in a joined sate, the disk cartridges can be mounted in a stacker of a changer drive.

Hereinafter, the disk cartridge according to the present invention will be detailed by way of embodiments with reference to the appended drawings.
(Embodiment 1)

The following description is directed to an embodiment of the disk cartridge according to the present invention by referring to FIGS. 1 to 8.

FIG. 1 is an exploded perspective view showing constituent components of a disk cartridge according to Embodiment 1 of the present invention. In the figure, reference numerals 100, 200, and 300 denote an outer case, an inner case, and an optical disk, respectively. Further, reference numerals 400 and 500 denote a locking member and a write-protect identifying member, respectively.

The optical disk 300 shown FIG. 1 is composed of an optical disk main body 301 and an attracting plate 302 of a magnetic material that is provided in a center hole. The attracting plate 302 is attracted to a magnet provided on a turntable of a spindle motor of a drive. That is, the optical disk 300 is a magnetic clamp type optical disk.

However, the optical disk according to the present invention is not limited thereto and also may be an optical disk without the attracting plate 302, i.e. an optical disk that is configured only of the optical disk main body 301, in other words, an optical disk adapted for mechanical clamping in which clamping of an optical disk is performed using a damper provided in a drive. Either of the above-mentioned types of optical disks can be used. The optical disk 300 is housed in a concave portion 230 of the inner case 200, which is recessed in the shape of a circle. In order to allow the optical disk 300 to be rotated in the concave portion 230, the concave portion 230 has an inner diameter somewhat larger than an outer diameter of the optical disk 300 and a depth somewhat larger than a thickness of the optical disk 300.

The outer case 100 has an opening 101 on one side face and thus has the shape of a hollow box. The inner case 200 housing the optical disk 300 is housed within a hollow portion of the outer case 100 such that the inner case 200 can be pulled out from the opening 101 in a direction indicated by an arrow 200a. When the outer case 100 is viewed from a normal direction with respect to a surface of the optical disk 300, the outer case 100 has a substantially square shape, and on a side on the side of the opening 101 of each of an upper side plate 100a and a lower side plate 100b of the outer case 100, a substantially V-shaped cutout 104 is formed that is formed by a circular arc 102 and a straight line 103 connected to the circular arc 102. The straight line 103 is inclined with respect to sides on an outer periphery of the substantially rectangular outer case 100. The circular arc 102 has a radius larger than a radius of the spindle motor for rotating the optical disk 300 that is provided in the drive. In a plane parallel to a plane of the optical disk 300, a position of a center of the circular arc 102 in a direction orthogonal to the directions indicated by the arrow 200a, i.e. come-in/out directions 200a of the inner case 200 substantially coincides with a position of a center of the optical disk 300 in the direction orthogonal to the come-in/out directions 200a when the inner case 200 mounting the optical disk 300 is housed in the outer case 100.

When the inner case 200 is viewed from the normal direction with respect to the surface of the optical disk 300, the inner case 200 has a substantially square shape, and on one of a pair of sides of the inner case 200 that are parallel to the come-in/out directions 200a, a substantially U-shaped cutout 203 is formed that is formed by a circular arc 201 centered at a center of the circular concave portion 230 (namely, a rotation center of the optical disk 300 that is placed in the concave portion 230) and two straight lines 202 parallel to each other that are connected to the circular arc 201. The two straight lines 202 are inclined with respect to sides on an outer periphery of the substantially rectangular inner case 200. The spindle motor of the drive is inserted into a portion of the cutout 203 that is defined by the circular arc 201, and an optical head of the drive is inserted into a portion of the cutout 203 between the two straight lines 202 parallel to each other. Accordingly, the circular arc 201 has a radius larger than a radius of the spindle motor for rotating the optical disk 300 that is provided in the drive. When the inner case 200 is housed in the outer case 100, the straight lines 202 and the straight line 103 forming the substantially V-shaped cutout 104 of the outer case 100 are inclined in directions substantially parallel to each other.

In an end portion of the inner case 200 that is exposed from the opening 101 of the outer case 100 when the inner case 200 is inserted into the outer case 100 (hereinafter, this end portion is referred to as a "front end"), a V-shaped notch 204 is provided at a position closer to one end portion of an end face, and a notch 250, to which the write-protect identifying member 500 is attached, is provided at a position closer to the other end portion of the end face.

Furthermore, in a corner portion of the front end of the inner case 200, an aperture portion (through hole) 240 is provided, in which a locking member 400 is attached. On a side wall of the opening portion 240, an aperture 246 is provided, from which a locking projection 403 of the locking member 400 projects, and on a side closer to the front end, a U-shaped notch 247 is provided that is used to perform a lock releasing operation. Reference numeral 248 denotes a pair of projections between which a spring portion 402 of the locking member 400 is held so that the locking member 400 can be prevented from falling off from the aperture portion 240 of the inner case 200.

On a side wall near an end portion of the inner case 200 on a side opposite the front end (hereinafter, this end portion is referred to as a "rear end"), an elastic claw portion 209 is provided that is molded integrally with the inner case 200.

Reference numeral 208 denotes a cover that is opposed to a bottom face of the concave portion 230 at a predetermined distance. The cover 208 has a peripheral end shape that coincides with the shape of the substantially V-shaped cutout 104 of the outer case 100. When the inner case 200 is housed completely in the outer case 100, the cover 208 fits in the cutout 104 of the outer case and thus functions to prevent dust from entering inside the outer case 100. Further, when the inner case 200 is pulled out from the outer case 100, the cover 208 functions to prevent the optical disk 300 from falling off from the concave portion 230 to the exterior.

The locking member 400 may have a substantially V shape. The locking member 400 includes a rotation shaft 401 provided in a portion corresponding to an apex of the substantially V shape, the elastically deformable spring portion 402 formed on one side with respect to the rotation shaft 401, the locking projection 403 formed in a side portion on the other side with respect to the rotation shaft 401, and a releasing lever 404 formed on a side opposite the rotation shaft 401 with respect to the locking projection 403, which are molded integrally into one body.

The write protect identifying member 500 may be a molded product that is substantially square C-shaped in cross section.

Figures 2A, 2B:
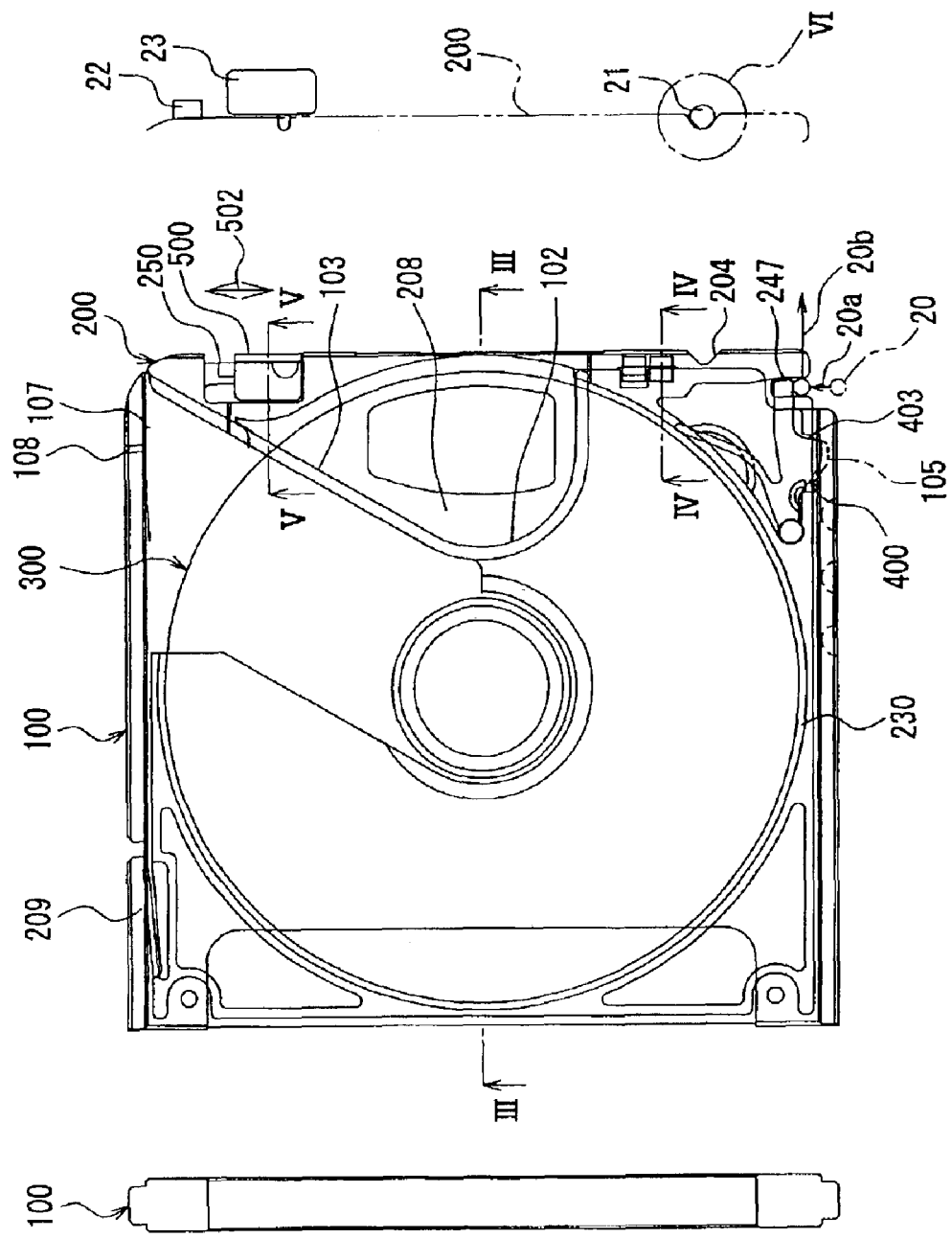
FIGS. 2A and 2B are a perspective plan view and a rear side view, respectively, showing the disk cartridge according to Embodiment 1 of the present invention.
Figure 3:
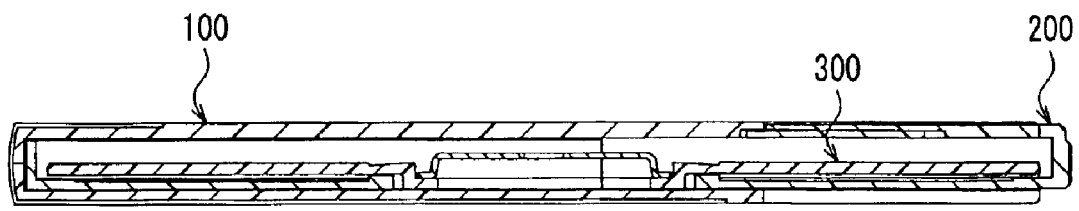
FIG. 3 is a cross sectional view taken on line III—III passing over a rotation center of an optical disk in FIG. 2A.
Figure 4:
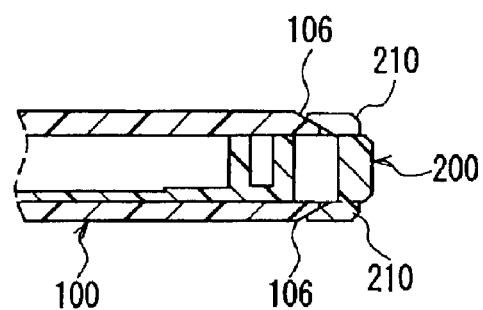
FIG. 4 is a cross sectional view taken on line IV—IV of FIG. 2A.
Figure 5:
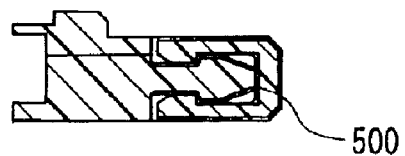
FIG. 5 is a cross sectional view taken on line V—V passing through a write-protect identifying member in FIG. 2A.

FIGS. 2A and 2B show a state in which the above-mentioned components are assembled. FIG. 2A is a perspective plan view, and FIG. 2B is a rear side view. FIG. 3 is a cross sectional view taken on line III—III passing over the rotation center of the optical disk 300 in FIG. 2A. FIG. 4 is a cross sectional view taken on line IV—IV of FIG. 2A, and FIG. 5 is a cross sectional view taken on line V—V passing through the write-protect identifying member 500 in FIG. 2A.

The optical disk 300 is housed within the concave portion 230 of the inner case 200, and the inner case 200 is housed inside the outer case 100 such that the inner case 200 can be pulled out. The locking projection 403 of the locking member 400 that is attached in the corner portion at the front end of the inner case 100 projects from the aperture 246 (see FIG. 1) of the inner case 200 and is fitted in a locking recessed portion 105 that is provided on an inner wall of the outer case 100. This reduces the chances of the inner case 200 being pulled out accidentally from the outer case 100.

The cover 208 formed in an upper portion of the inner case 200 is fitted in the substantially V-shaped cutout 104 formed by the circular arc 102 and the inclined straight line 103.

When the inner case 200 is housed completely in the outer case 100, as shown in FIG. 4, an inclined convex piece 210 provided on each surface of the inner case 200 at the front end is engaged with each of inclined faces 106 provided at an end of the opening 101 of the outer case 100. By this engaging configuration, the upper and lower side plates of the outer case 100 can be prevented from separating from upper and lower surfaces of the inner case 200 due to warpage, and thus the dust-proof property can be improved.

As shown in FIG. 5, the write-protect identifying member 500 is a molded product that is substantially square C-shaped in cross section and inserted from the front into the notch 250 formed on a front end face of the inner case 200. The write protect identifying member 500 can be moved in directions parallel to the front end face of the inner case 200, namely, directions indicated by an arrow 502. Based on a position of the write-protect identifying member 500 in the directions indicated by the arrow 502, it can be judged whether or not a writing/erasing operation for the optical disk 300 that is housed is inhibited (a write-protect state). When the inner case 200 is housed completely in the outer case 100, as shown in FIG. 2A, the write-protect identifying member 500 is disposed so as to be exposed in the substantially V-shaped cutout 104 of the outer case 100. The write-protect identifying member 500 is substantially square C-shaped in cross section, structured to be inserted from the front end of the inner case 200, and disposed so as to be exposed in the substantially V-shaped cutout 104 of the outer case 100. This allows the write-protect identifying member 500 to be pinched by fingers so that easy operation of the write-protect identifying member 500 can be achieved.

When this disk cartridge is loaded into the drive, a pull-out pin 200 provided in the drive is inserted into the U-shaped notch 247 provided in the inner case 200 from outside in a direction indicated by an arrow 20a. In this case, the pull-out pin 20 pushes the releasing lever 404 of the locking member 400 projecting in the U-shaped notch 247, and thus the locking member 400 is rotated, thereby releasing a lock. After that, the pull-out pin 20 moves in a direction indicated by an arrow 20b, so that the inner case 200 is pulled out from the outer case 100.

Figure 6A:
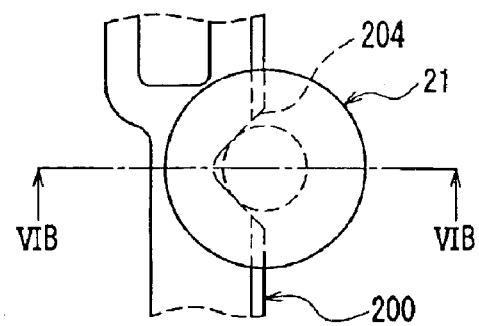
FIG. 6A is an expanded plan view illustrating a method of positioning an inner case through the use of a V-shaped notch when the inner case is pulled out in a drive in Embodiment 1 of the present invention.
Figure 6B:
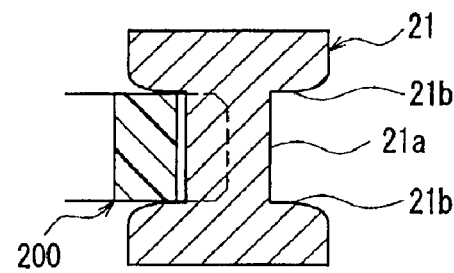
FIG. 6B is a cross sectional view taken on line VIB—VIB of FIG. 6A.

In FIG. 2A, a chain double-dashed line indicates a position of the front end of the inner case 200 when the inner case 200 is pulled out in a single-disk drive to such a degree that recording and/or reproduction can be performed with respect to the optical disk 300 (a state shown in FIG. 11B, which will be described later). In this case, the V-shaped notch 204 formed at the front end of the inner case 200 is brought into contact with a side face of a cylindrical reference pin 21 provided in the drive. This state is shown in FIGS. 6A and 6B. FIG. 6A is an expanded plan view of a section VI shown in FIG. 2A, and FIG. 6B is a cross sectional view taken on line VIB—VIB of FIG. 6A. The reference pin 21 may be composed of a cylinder portion 21a having a height that is substantially the same as a thickness of a front end portion of the inner case 200 and height controlling flange portions 21b that are provided respectively at upper and lower ends of the cylinder portion 21a and have a diameter larger than an outer diameter of the cylinder portion 21a. The cylinder portion 21a controls a position of the inner case 200 in the plane parallel to the plane of the optical disk 300. The pair of the height controlling flange portions 21b control a position of the inner case 200 in the normal direction (height direction) of the plane of the optical disk 300.

In FIG. 2A, reference numeral 22 denotes an auxiliary reference pin provided in the drive. When the inner case 200 is pulled out to the position indicated by the chain double-dashed line, the front end face of the inner case 200 is brought into contact with a side face of the auxiliary reference pin 22, and thus a position of the inner case 200 in the plane parallel to the plane of the optical disk 300 is controlled by the auxiliary reference pin 22 in combination with the above-mentioned reference pin 21. That is, through the use of the reference pin 21 and the auxiliary reference pin 22, a position of the inner case 200 in the plane parallel to the plane of the optical disk 300 is controlled, thereby allowing the rotation of the inner case 200 in the plane to be controlled.

As described above, in the disk cartridge according to this embodiment, simply by pulling out the inner case 200 to a predetermined position, the V-shaped notch 204 provided in a portion on the front end face of the inner case 200 is brought into contact with the reference pin 21, and the front end face of the inner case 200 is brought into contact with the auxiliary reference pin 22. Therefore, positioning of the inner case 200 in the normal direction and the parallel direction with respect to the plane of the optical disk 300 can be performed with accuracy. Thus, unlike the case with the conventional disk cartridge, positioning does not require a disk cartridge or a drive to be moved in a normal direction with respect to a plane of an optical disk, thereby allowing the drive to be reduced in thickness (dimension in the normal direction of the optical disk).

In FIG. 2A, reference numeral 23 denotes a detection switch provided in the drive. When positioning is performed so that the inner case 200 is pulled out to the position indicated by the chain double-dashed line, the detection switch 23 detects a state of the write-protect identifying member 500 (position in the directions indicated by the arrow 502).

In the disk cartridge according to this embodiment, the write-protect identifying member 500 is provided on the front end face of the inner case 200, and therefore, simply by pulling out the inner case 200 to a predetermined position, a write-protect state can be detected Thus, unlike the case with the conventional disk cartridge, the detection of write protection does not require a detection switch provided in a drive or a disk cartridge to be moved in a normal direction with respect to a plane of an optical disk, thereby allowing the drive to be reduced in thickness (dimension in the normal direction of the optical disk).

Figure 7:
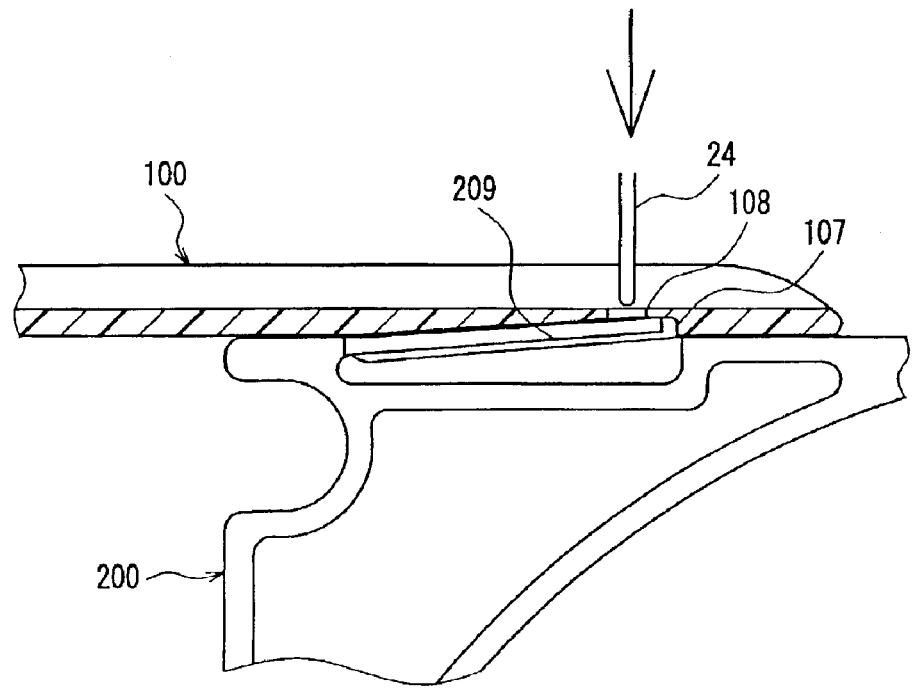
FIG. 7 is a sectional plan view illustrating a function of a claw portion provided at a rear end portion of the inner case in the disk cartridge according to Embodiment 1 of the present invention.

In this disk cartridge, in a state where the inner case 200 is housed in the outer case 100, the releasing lever 404 of the locking member 400 is pushed by a user using a sharp implement, and thus a lock is released, thereby allowing the inner case 200 to be pulled out from the outer case 100. In this case, in order to prevent a complete pull-out of the inner case 200 from the outer case 100 that accidentally may cause the inner case 200 or the optical disk 300 to fall off, the claw portion 209 is provided in a corner portion of the rear end of the inner case 200. As shown in FIG. 7, an inclined concave portion 107 is provided on an inner side wall near the opening 101 of the outer case 100. In a position immediately before the inner case 200 is pulled out completely from the outer case 100, as shown in FIG. 7, the claw portion 209 is engaged with the concave portion 107. Therefore, the inner case 200 can be prevented from falling off from the outer case 100, thereby allowing the improved safety to be achieved. On the other hand, when the inner case 200 is required to be pulled out completely from the outer case 100 for some reason, a sharp implement 24 is inserted into a through hole 108 provided on a side face of the outer case 100. This alone is enough for the claw portion 209 to be deformed elastically, thereby disengaging the claw portion 209 from the concave portion 107, so that the inner case 200 can be pulled out completely from the outer case 100. After that, when the inner case is inserted back into the outer case 100, since a recess of the concave portion 107 is formed in the shape of a wedge, while being deformed elastically, the claw portion 209 can be inserted without being engaged with the concave portion 107. Thus, for example, in plants, it is made possible to exchange faulty optical disks and insert optical disks into cartridges after being assembled, and thus the degree of freedom in the manufacturing process can be increased, thereby allowing the productivity to be improved.

Figure 8E:
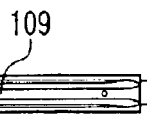
FIGS. 8D, 8E and 8F are a side view of a front portion, a right side view, and a back face view, respectively, showing an external configuration of the disk cartridge according to Embodiment 1 of the present invention.
Figure 8C:
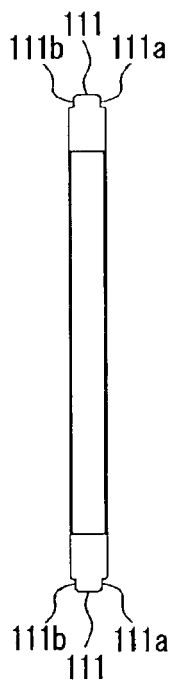
FIGS. 8A, 8B and 8C are a plan view, a left side view, and a side view of a rear portion, respectively.
Figure 8A:
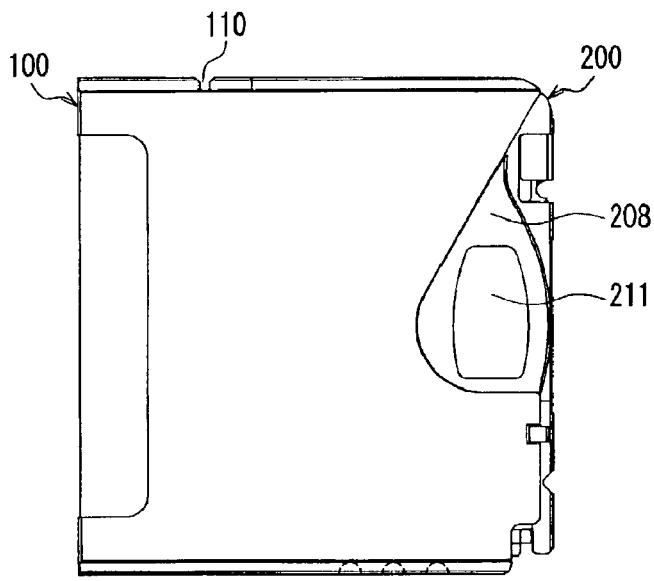
Figure 8D:
Figure 8B:
Figure 8F:
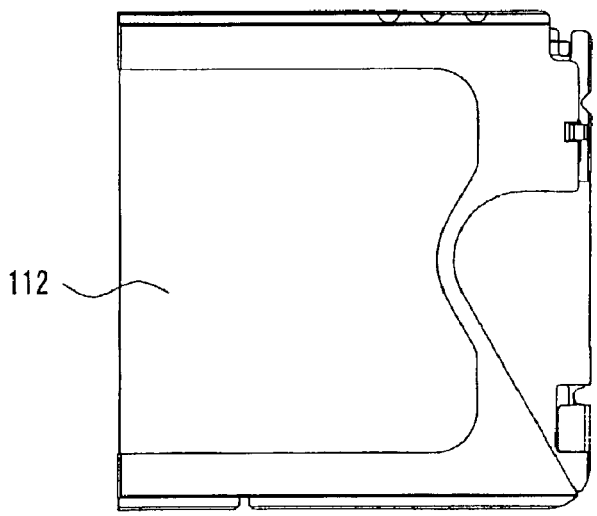

FIGS. 8A to 8F constitute a six-sided view of the disk cartridge according to this embodiment. FIGS. 8A, 8B, and 8C are a plan view, a left side view, and a side view of a rear portion, respectively. FIGS. 8D, 8E, and 8F are a side view of a front portion, a night side view, and a back face view, respectively. Hereinafter, the disk cartridge according to the present invention will be detailed further by referring to portions that have not been described yet, with reference to these figures.

In the figures, reference numeral 109 denotes an insertion error preventing groove that is provided on one side face of the outer case 100 (in this example, a right side face) so as to be parallel to a direction in which the disk cartridge is inserted into the drive (namely, the come-in/out directions of the inner case 200 with respect to the outer case 100). An insertion error preventing projection that is allowed to slide within the groove 109 is provided near an entrance of the drive for disk cartridge insertion. When an attempt is made to insert the disk cartridge into the drive in an erroneous direction, the insertion error preventing projection collides with the disk cartridge so as to prevent the insertion of the disk cartridge.

Reference numeral 110 denotes a pull-out preventing groove that is provided in a direction orthogonal to the direction in which the disk cartridge is inserted into the drive (namely, the come-in/out directions of the inner case 200 with respect to the outer case 100). At the time when the disk cartridge is being inserted into the drive or a stacker of a changer drive, a pull-out preventing mechanism that is provided in the drive or the stacker is engaged with the pull-out preventing groove 110. As a result, for example, if the inner case 200 is in a state of being pulled out from the outer case 100, pull-out of the disk cartridge from the stacker can be prevented mechanically from being caused accidentally.

Reference numeral 111 denotes a convex guide piece that is provided on each side face (left side face and right side face) of the outer case 100 so as to be parallel to the direction in which the disk cartridge is inserted into the drive (namely, the come-in/out directions of the inner case 200 with respect to the outer case 100). The guide piece 111 has two opposed faces 111a and 111b that are substantially parallel to the plane of the optical disk. In a direction orthogonal to a direction to which the guide piece 111 is extended, a distance between the two faces 111a and 111b is narrower than a thickness of the outer case 100.

Figure 9:
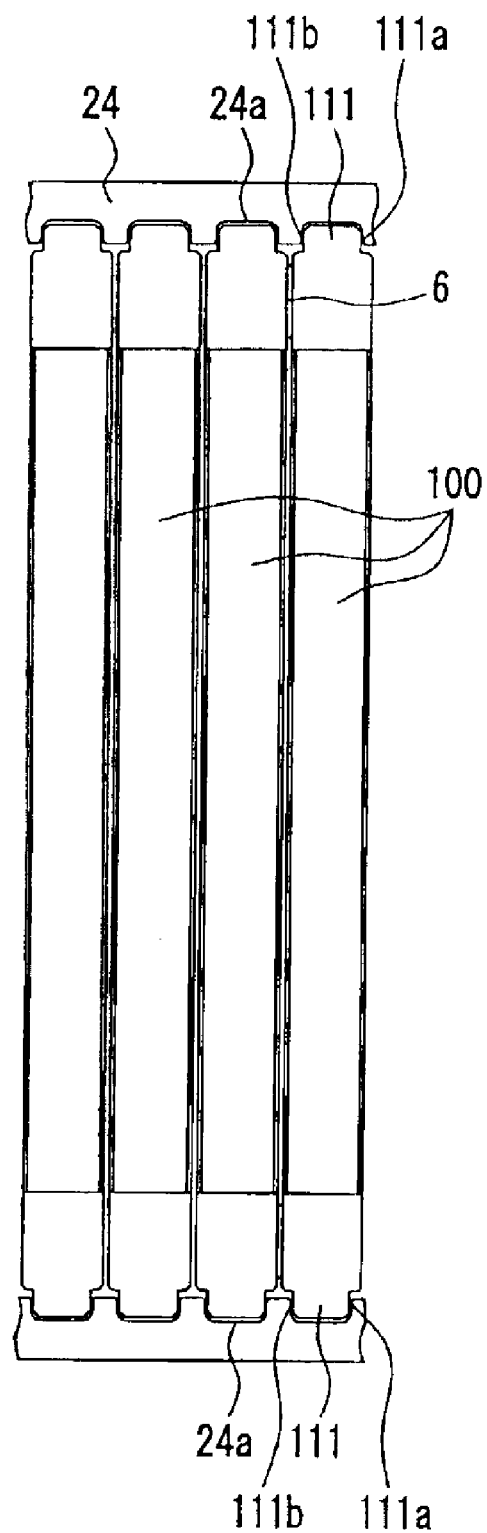
FIG. 9 is a diagrammatic view showing a state in which the disk cartridge according to Embodiment 1 of the present invention is inserted into a stacker of a changer drive.

The following description is directed to a function of this guide piece 111 by referring to FIG. 9. In the figure, reference numerals 24 and 24a denote a stacker portion of a changer drive and a guide groove provided in the stacker portion 24, respectively. When the disk cartridge is inserted into the stacker portion 24, the convex guide piece 111 of the outer case 100 is allowed to slide within the guide groove 24a of the stacker portion 24. After the insertion, the guide piece 111 is fitted in the guide groove 24a, and thus a position of the disk cartridge in the normal direction of the surface of the contained optical disk is controlled. If the two faces 111a and 111b constituting the guide piece 111 are inclined with respect to the plane of the optical disk, a dimensional error in a height direction of the outer case 100 results in a positional shift of the disk cartridge in the normal direction of the plane of the optical disk. However, the two faces 111a and 111b of the guide piece 111 according to this embodiment are substantially parallel to the plane of the optical disk, and thus, regardless of whether or not the outer case 100 has a dimensional error in the height direction of the outer case 100, a position of the disk cartridge in the normal direction of the plane of the optical disk with respect to the stacker portion 24 is controlled with accuracy.

Figure 10A:
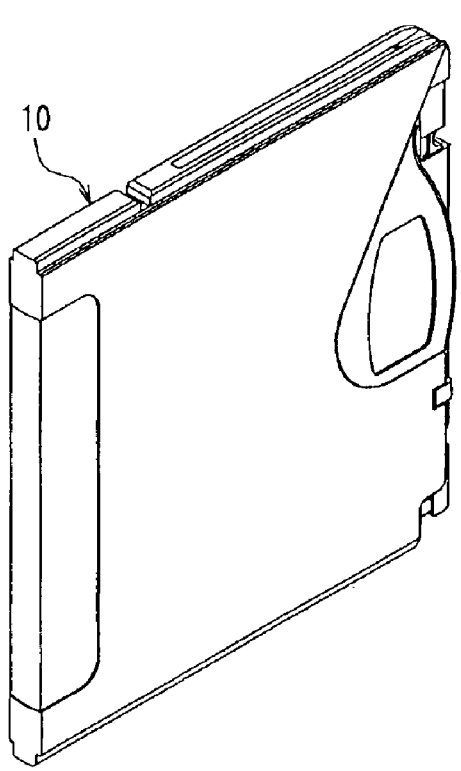
FIG. 10A is a perspective view of the disk cartridge according to Embodiment 1 of the present invention.
Figure 10B:
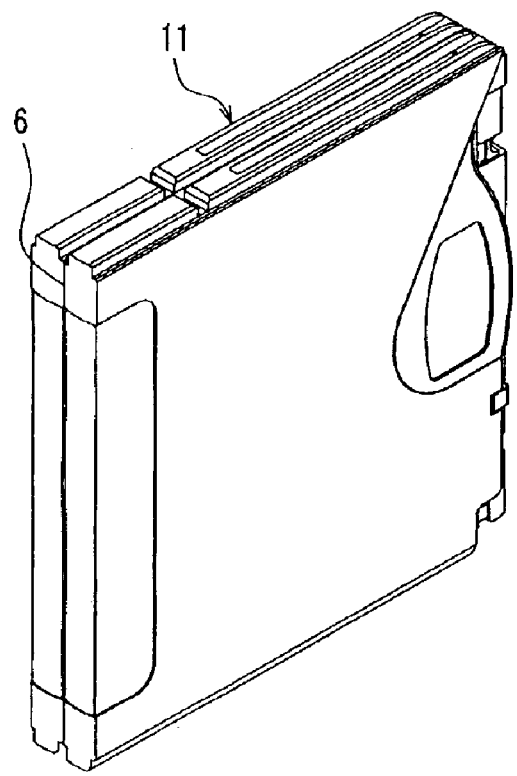
FIG. 10B is a perspective view showing a state in which two of the disk cartridges according to Embodiment 1 of the present invention are held together using a double-faced tape.

Moreover, a width of the convex guide piece 111 (distance between the two faces 111a and 111b) is smaller than the thickness of the outer case 100, and thus as shown in the figure, disk cartridges can be arranged in close contact with each other in the stacker portion 24. This indicates that a plurality of disk cartridges joined to each other, e.g. bonded using a double-faced adhesive tape 6, also can be inserted into the stacker portion 24 in that state. A single-disk cartridge 10 as shown in FIG. 10A, and two coupled disk cartridges 11 that are bonded to each other in the same orientation using a double-faced adhesive tape 6 as shown in FIG. 10B also can be housed in the stacker portion 24 in the respective states. Therefore, in the case where it is convenient to handle a plurality of disk cartridges as a set, for example, a two-disk set or a three-disk set, it is made possible to handle these disk cartridges always as one body, thereby considerably increasing the convenience of handling a plurality of disks. Further, the disk cartridges can be housed in close contact with each other in the stacker portion 24, thereby maximizing the efficiency of housing disk cartridges in the stacker portion 24. In a conventional method of handling a plurality of disk cartridges as a set, a joining member is used to join the disk cartridges to each other. However, a size reduction of a disk cartridge results in an excessive size reduction of a joining member, and thus a joining operation may be hindered and the joining member becomes more likely to be lost. In this embodiment, the disk cartridges may be joined to each other simply by using a double-faced adhesive tape, thereby allowing these problems in the conventional technique to be solved. A joining means that can be used is not limited to the double-faced adhesive tape 6 and for example, may be formed of a glue or an adhesive.

Referring back to FIG. 8, reference numeral 112 denotes an area (label area) on which a label is attached. Information recorded on the optical disk and the like is written on the label. This disk cartridge does not include a shutter, and thus a large area can be secured as the label area. The disk cartridge also can be used optimally for ROM disks.

Reference numeral 113 denotes a detection hole for detecting a type of an optical disk. The detection hole 113 is provided near a front end of the side face (in this example, the left side face) of the outer case 100. A forming position, a size and the like of the detection hole 113 are determined according to information regarding a contained optical disk (for example, information regarding a ROM disk, a recordable disk, a type of a medium or the like). According to this configuration, at a point in time when a disk cartridge is inserted into a holder of a drive or a stacker of a changer drive (that is, before the inner case 200 is pulled out from the outer case 100), information regarding a contained optical disk can be detected. Thus, disk controlling information can be detected at an early point in time, thereby achieving a quick start-up.

Reference numeral 211 denotes a sub label area that is provided on the cover 208 of the inner case 200. For example, the above-mentioned information regarding the contained optical disk or the like may be recorded on a label in the form of a bar code or the like, and the label is attached on the sub label area 211. Thus, without the use of the detection hole 113, during a loading operation of the disk cartridge, disk controlling information regarding the contained optical disk can be detected, thereby allowing the same effect as that in the case of using the above-mentioned detection hole 113 to be attained. A method of recording disk controlling information is not limited to a method using a bar code. Other recording methods also may be employed.

Figure 11A:
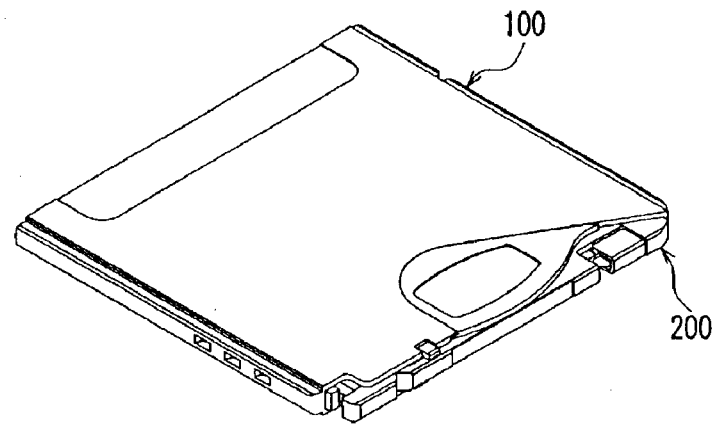
FIGS. 11A, 11B and 11C are perspective views of the disk cartridge according to Embodiment 1 of the present invention: 11A shows a state in which the inner case is housed completely in an outer case.
Figure 11B:
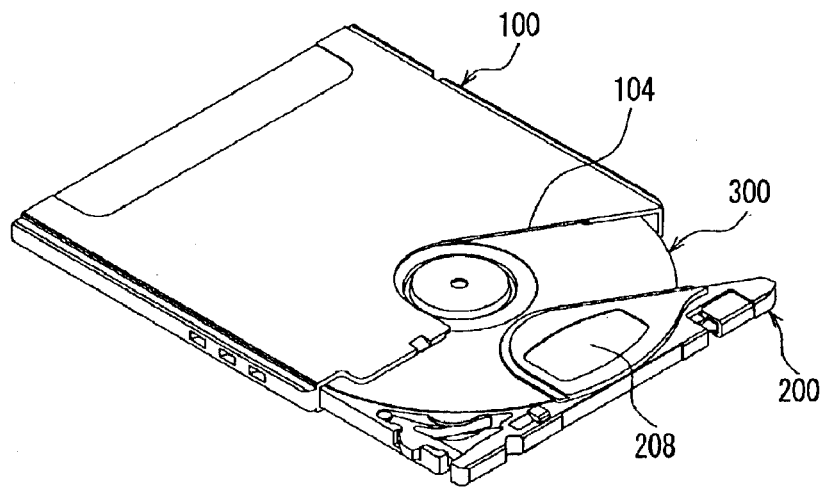
Figure 11C:
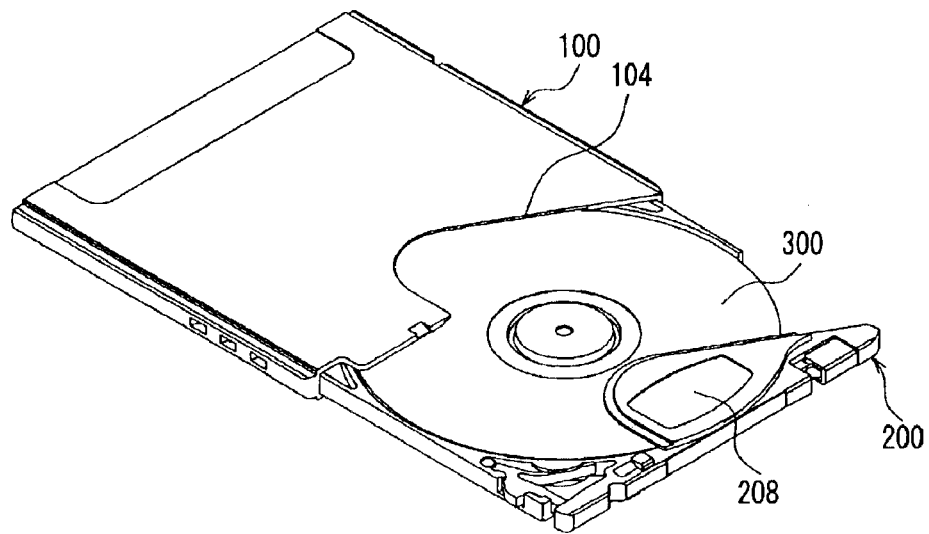

FIGS. 11A to 11C are perspective views of the disk cartridge according to Embodiment 1 of the present invention. FIG. 1A shows a state in which the inner case 200 is housed completely in the outer case 100, FIG. 11B shows a state in which the inner case 200 is pulled out from the outer case 100 so that the optical disk 300 is housed in the outer case 100 by not less than half the size of the optical disk 300, and FIG. 11C shows a state in which the inner case 200 is pulled out from the outer case 100 so that the optical disk 300 is exposed outside the outer case 100 by not less than half the size of the optical disk 300.

FIG. 11B shows a pull-out state of the inner case 200 when the disk cartridge is loaded into a drive of a type into which a single disk cartridge is loaded (single-disk drive) such as a drive of a notebook personal computer or a PDA. In this case, while a pull-out amount of the inner case 200 is reduced to a small value, the cutouts 104 of the outer case 100, the cutout 203 of the inner case 200 and the cover 208 form apertures in which the optical disk 300 is exposed, and through these apertures, a turntable of a spindle motor, a clamper, an optical head and a magnetic head that are provided in the drive can be moved toward the optical disk 300.

FIG. 11C shows a pull-out state of the inner case 200 when the disk cartridge mounted in a changer drive is loaded into a drive unit. Similarly, in this case, the cutouts 104 of the outer case 100, the cutout 203 of the inner case 200 and the cover 208 form apertures in which the optical disk 300 is exposed, and through these apertures, a turntable of a spindle motor, a clamper, an optical head and a magnetic head can be moved toward the optical disk 300.

Next, a configuration of a single-disk drive into which the disk cartridge according to the present invention is loaded will be described with reference to FIGS. 12A to FIG. 14.

Figure 12A:
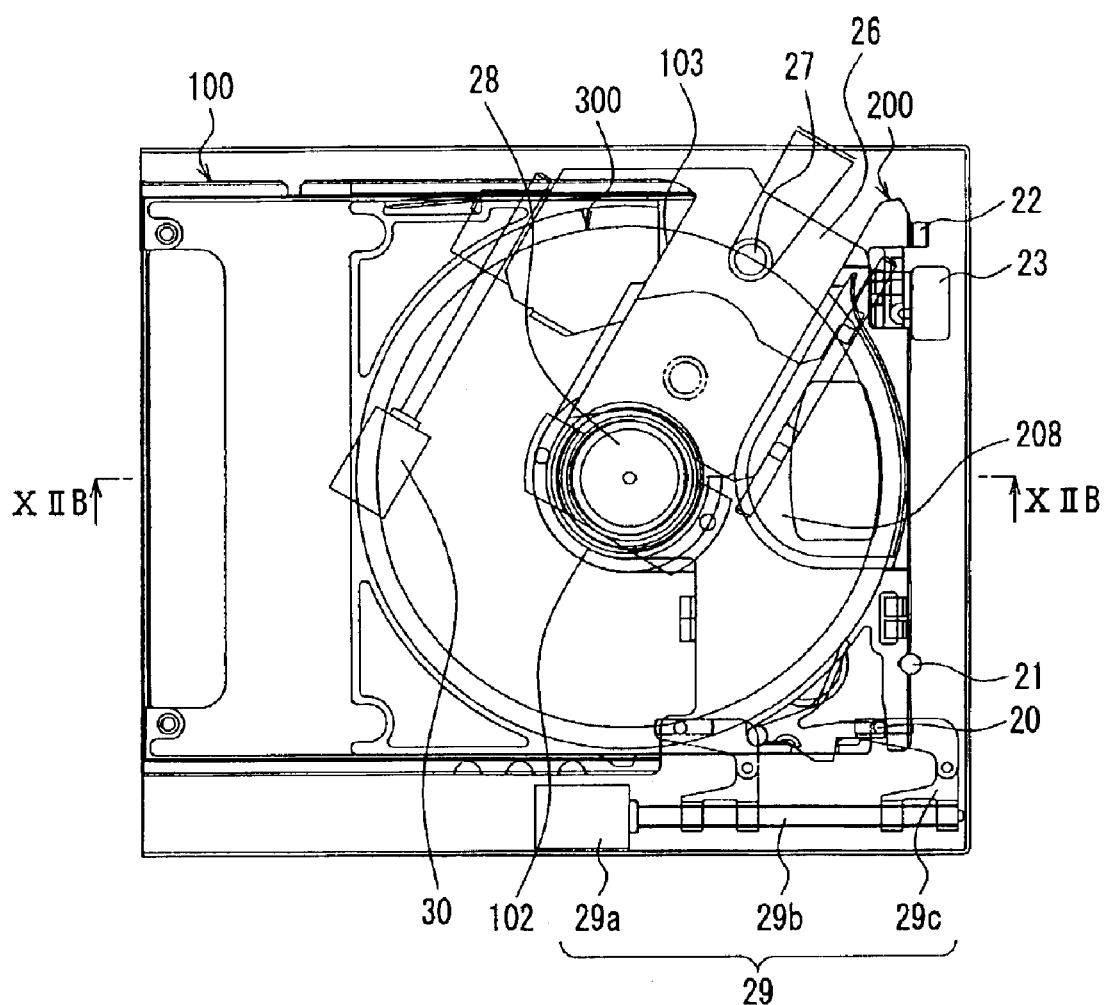
FIG. 12A is a plan view showing a state in which the disk cartridge according to Embodiment 1 of the present invention is loaded into a single-disk drive.
Figure 12B:
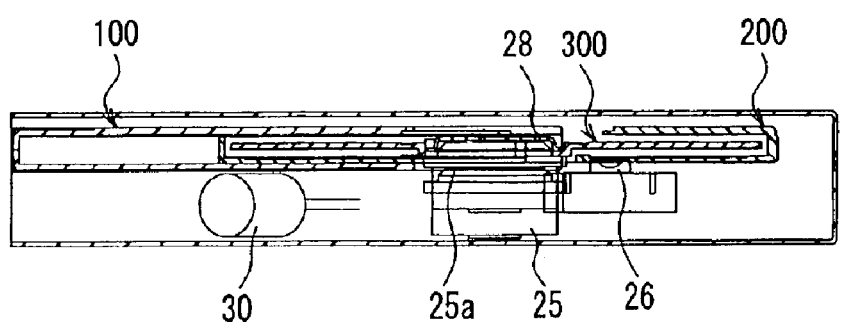
FIG. 12B is a cross sectional view taken on line XIIB—XIIB of FIG. 12A.

FIGS. 12A is a plan view showing a state in which the disk cartridge according to the present invention is loaded into the single-disk drive, and FIG. 12B is a cross sectional view taken on line XIIB—XIIB of FIG. 12A.

In FIGS. 12A and 12B, reference numerals 21, 22 and 23 denote a reference pin, an auxiliary reference pin, and a detection switch for detecting the write-protect identifying member 500, respectively. These components are the same as those described with reference to FIG. 2A. The movements of the pull-out pin 20 along the arrows 20a and 20b that were described with reference to FIG. 2A are realized by a pull-out driving mechanism 29 composed of a driving motor 29a, a feed screw 29b, and a cranking mechanism 29c. FIG. 12A shows a state in which the inner case 200 is pulled out to a position indicated by the chain double-dashed line shown in FIG. 2A using the pull-out pin 20, which is the same as the state shown in FIG. 11B.

When viewed from the normal direction of the optical disk 300, the circular arc 102 forming the substantially V-shaped cutout 104 of the outer case 100 substantially coincides with a portion of the circular arc 201 forming the substantially U-shaped cutout 203 of the inner case 200. The straight line 103 forming the substantially V-shaped cutout 104 substantially coincides with one of the pair of the straight lines 202 forming the substantially U-shaped cutout 203. As a result, on an upper side above the optical disk 300, the optical disk 300 is exposed from an aperture formed by the substantially V-shaped cutout 104 of the outer case 100 and the cover 208 of the inner case 200. On a lower side below the optical disk 300, the optical disk 300 is exposed from an aperture formed by the substantially V-shaped cutout 104 of the outer case 100 and the U-shaped cutout 203 of the inner case 200. Through the aperture on an upper surface side of the optical disk 300, a damper 28 and a magnetic head 27 are inserted. Through the aperture on a lower surface side of the optical disk 300, a turntable 25a of a spindle motor 25 and an optical head 26 are inserted. The magnetic head 27 and the optical head 26 are moved as a unit parallel to the straight lines 103 and 202, namely, in a radial direction of the optical disk 300 by a feeding mechanism 30 that is composed of a feeding motor and a feed screw. Thus, recording and/or reproduction is performed with respect to the optical disk 300.

As described above, even when a pull-out amount of the optical disk 300 from the outer case 100 is reduced to an amount as small as less than half the diameter of the optical disk 300, recording and/or reproduction can be performed, thereby allowing a single-disk drive to be reduced in depth dimension (dimension in the pull-out direction of the inner case 200).

Figure 13A:
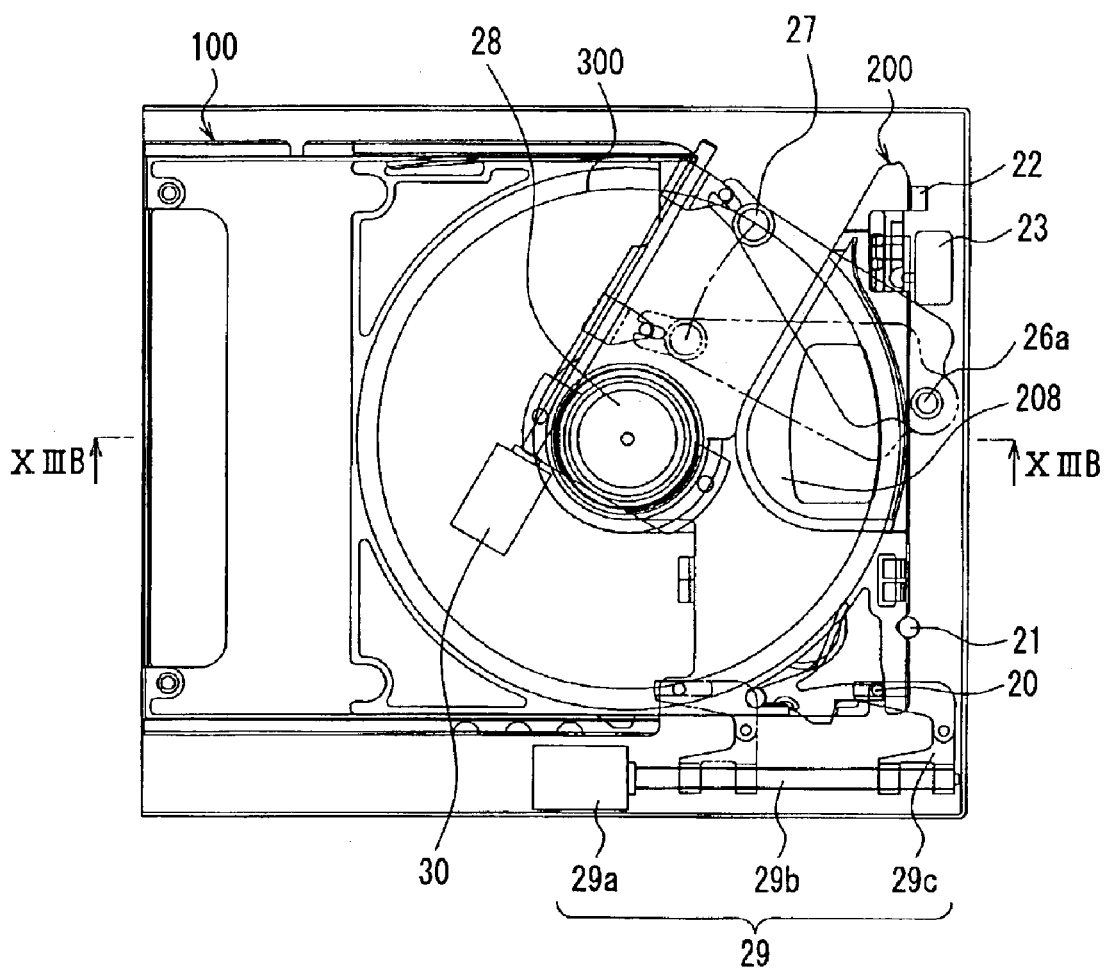
FIG. 13A is a plan view showing a state in which the disk cartridge according to Embodiment 1 of the present invention is loaded into a single-disk drive of another configuration.
Figure 13B:
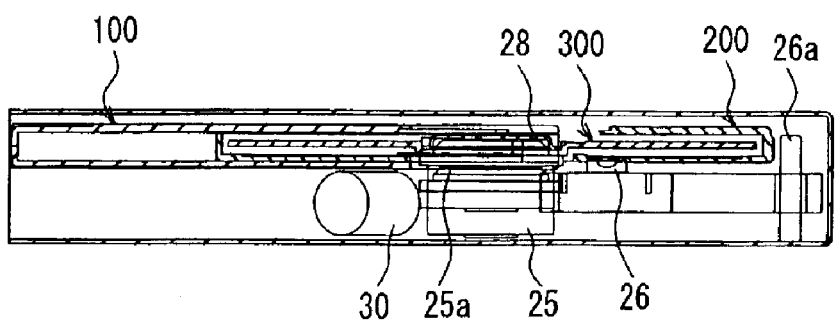
FIG. 13B is a cross sectional view taken on line XIIIB—XIIIB of FIG. 13A.

FIGS. 12A and 12B showed an example in which a magneto-optical head composed of the optical head 26 and the magnetic head 27 was moved rectilinearly in the radial direction of the optical disk 300. However, as shown in FIGS. 13A and 13B, a configuration also is possible in which the magneto-optical head is rotated about a shaft 26a. In the disk cartridge according to this embodiment, the straight line 103 forming the substantially V-shaped cutout 104 and the pair of straight lines 202 forming the substantially U-shaped cutout 203 are inclined with respect to four sides of the rectangular inner case 200. This allows the shaft 26a as a rotation center of the magneto-optical head of a rotary type to be disposed in a position other than four corner portions of the inner case 200. Thus, it is possible to use a rotary type magneto-optical head that can be used suitably for the realization of high-speed access, thereby improving the degree of design freedom of a magneto-optical head.

When the inner case 200 is pulled out so as to be in the state shown by FIGS. 12A, 12B, 13A and 13B, a center portion of the optical disk 300 on each surface is exposed. Therefore, clamping of the optical disk 300 can be performed by a mechanical clamping method in which an optical disk is held from both sides, or a magnetic clamping method in which an attracting plate attached to an optical disk is attracted magnetically from one side. Further, a recording/reproducing head also is not limited to the head for magneto-optical disks that requires each surface of an optical disk to be used. It also is possible to use a head for phase-change disks that only requires one surface of an optical disk to be used.

Figure 14:
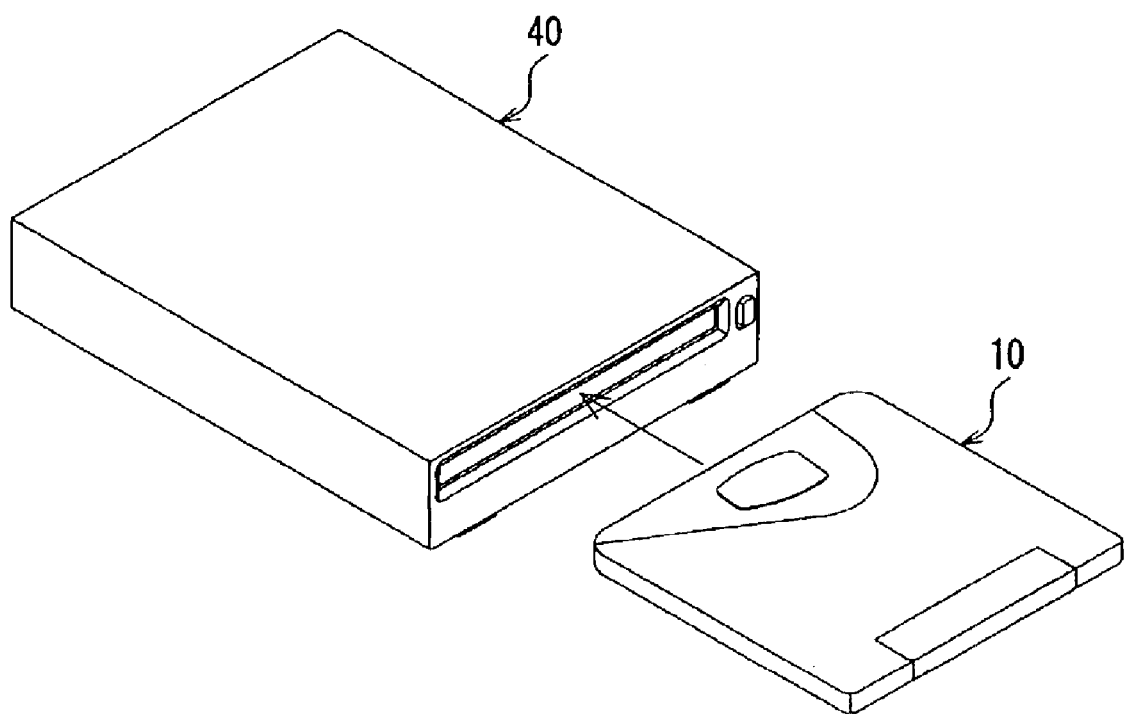
FIG. 14 is an external perspective view of a single-disk drive in which the disk cartridge according to the present invention is to be mounted.

FIG. 14 shows an external view showing a typical configuration of a single-disk drive. In the figure, reference numerals 10 and 40 denote the disk cartridge according to the present invention and a single-disk drive, respectively. By the disk cartridge 10 according to the present invention, a thin single-disk drive of a slot-in loading type that is reduced in depth dimension can be realized.

Figure 16:
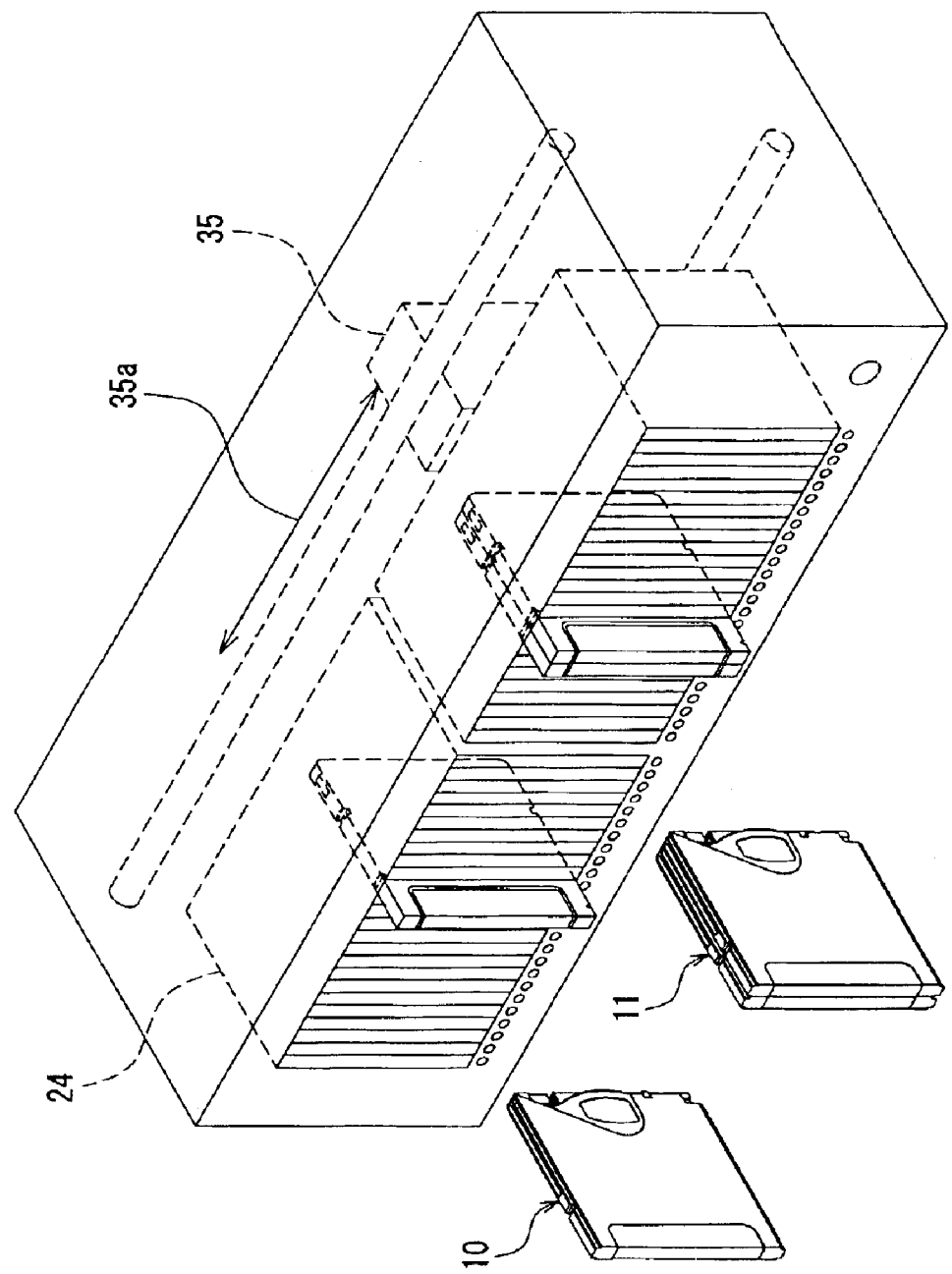
FIG. 16 is an external perspective view of a changer drive in which the disk cartridge according to the present invention is to be mounted.

With reference to FIGS. 15A and 15B and FIG. 16, the description is directed next to a configuration of a changer drive that is used in an AV library or an AV server.

FIG. 15A is a front view showing a pull-out state of the inner case 200 of the disk cartridge according to the present invention that is loaded into the changer drive. FIG. 15B is a cross sectional view taken on line XVB—XVB of FIG. 15A. Further, FIG. 16 is a schematic perspective view showing a configuration of the changer drive in which the disk cartridge according to the present invention is mounted.

A spindle motor 25 for rotating the optical disk 300 is required to be disposed at a center of the optical disk 300. Therefore, as shown in FIGS. 15A and 15B, the inner case 200 is pulled out from the outer case 100 so that the contained optical disk 300 is exposed outside the outer case 100 by not less than half the size of the optical disk 300. Thus, all constituent elements of a drive unit including the spindle motor 25, a magneto-optical head composed of an optical head 26 and a magnetic head 27, a feeding mechanism 30 for moving the magneto-optical head and the like can be disposed on a side opposite the outer case 100 with respect to the opening 101 of the outer case 100 (right side of a chain double-dashed line 101a). As a result, as shown in FIG. 16, a changer drive can be realized in which a stacker 24 for housing disk cartridges is disposed on a side of a user, and on a rear side of the stacker 24, a drive unit 35 is disposed that moves in arranging directions 35a of the disk cartridges. The drive unit 35 moves to a position of a selected disk cartridge, and pulls out the inner case 200 as shown in FIGS. 15A and 15B by a mechanism to pull out the inner case 200 that is provided in the drive unit 35. Thus, recording and/or reproduction can be performed with respect to the optical disk 300.

In this changer drive, as in the case of housing books in a bookcase, the disk cartridges can be loaded in close contact with each other into the stacker 24. Therefore, an increased number of cartridges can be housed in the stacker 24. Further, in addition to a single disk cartridge 10, a plurality of disk cartridges 11 that are bonded to each other using a double-faced adhesive tape or the like also can be inserted into the stacker 24 in that state. As a result, the convenience of handling a plurality of disks such as in the form of a two-disk set or the like can be increased considerably.

(Embodiment 2)

With the following limiting conditions regarding a type of an optical disk and a clamping method, the disk cartridge according to the present invention can be configured as shown in FIG. 17 and FIGS. 18A to 18C.

A first limiting condition is defined as a case where disk clamping is performed by a magnetic clamping method (method in which an attracting plate is attached to an optical disk). In a structure according to this clamping method, an optical disk is not held between a damper and a turntable of a spindle motor. Thus, in this case, space for clamping needs to be secured only on one side of an optical disk.

A second limiting condition is defined as a case where an optical disk is of a reflective optical disk such as a CD or a phase-change disk. In the case of using an optical head for reflective optical disks, unlike a magneto-optical head for magneto-optical disks, it is not necessary to use a magnetic head that is disposed on a side opposed to the optical head through the medium of an optical disk. Thus, space in which the optical head is disposed needs to be secured only on one side of an optical disk.

Figure 17:
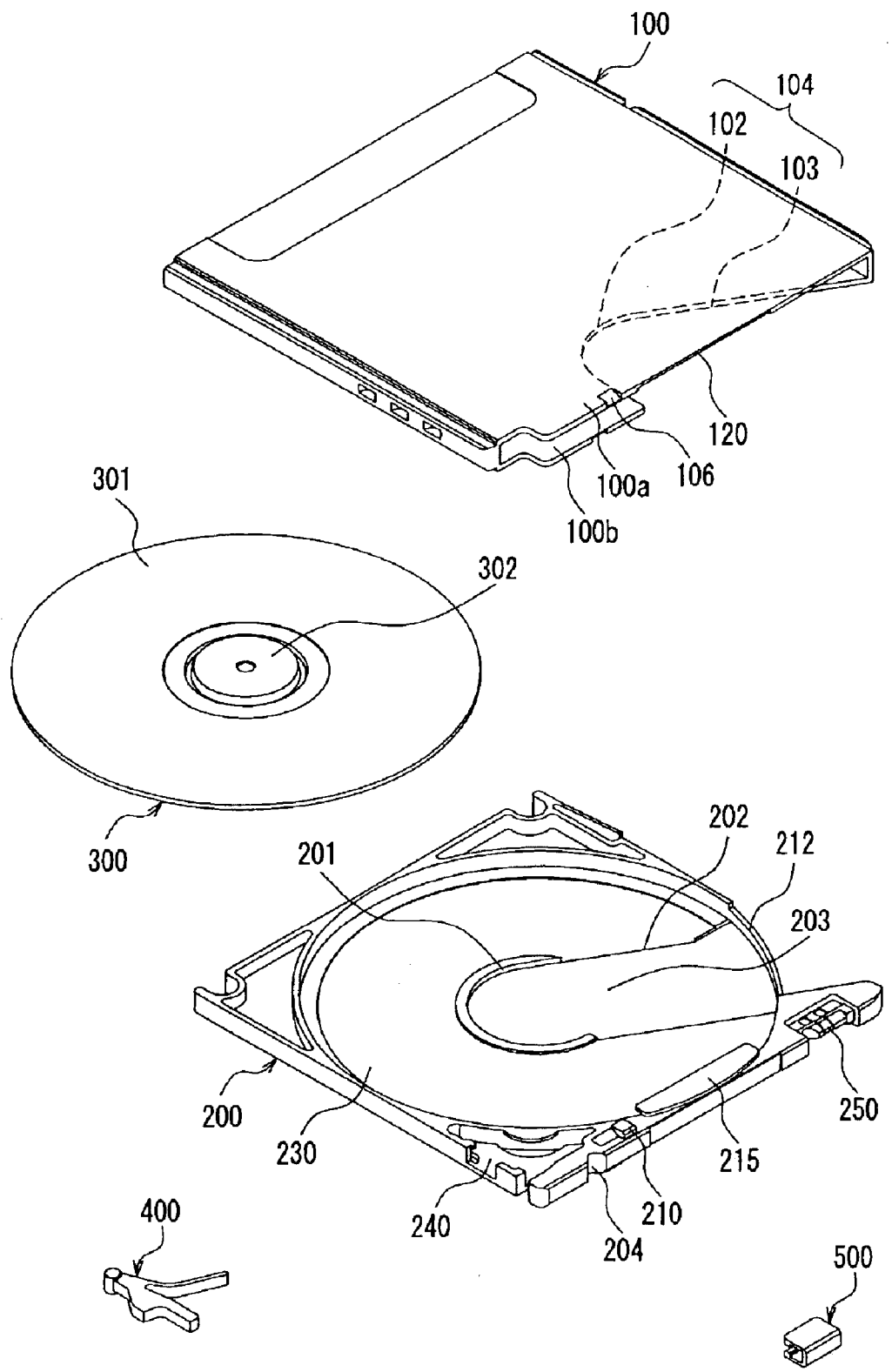
FIG. 17 is an exploded perspective view showing constituent components of a disk cartridge according to Embodiment 2 of the present invention.

FIG. 17 is an exploded perspective view showing constituent components of a disk cartridge according to Embodiment 2 of the present invention. The disk cartridge is configured so as to correspond to the above-mentioned two limiting conditions.

In an outer case 100, a substantially V-shaped cutout 104 formed by a circular arc 102 having a radius larger than a radius of a spindle motor and an inclined straight line 103 that is connected to the circular arc 102 is provided only on a lower side plate 100b of the outer case 100, and on a upper side plate 100a, a straight line portion 120 is provided instead of the substantially V-shaped cutout 104.

Figure 18A:
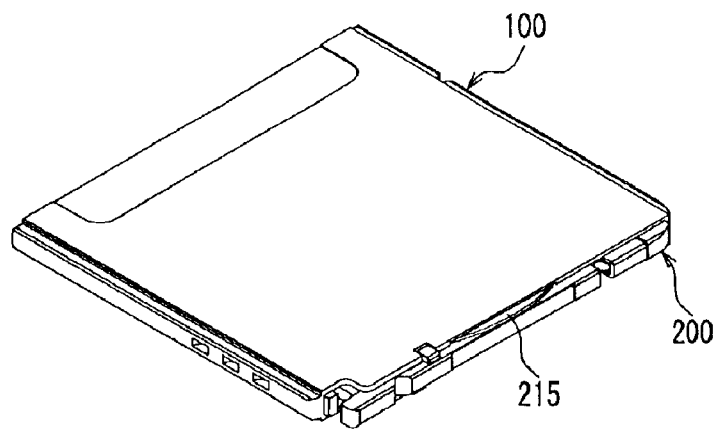
FIGS. 18A, 18B and 18C are perspective views of the disk cartridge according to Embodiment 2 of the present invention.

In an inner case 200, since the substantially V-shaped cutout 104 is not formed on the upper side plate 100a of the outer case 100, a cover 208 (see FIG. 1) to be fitted in the cutout 104 is not necessary. However, in order to prevent an optical disk 300 housed in a concave portion 230 from coming out, a projection 215 is provided so as to be opposed to and away from a bottom face of the concave portion 230. When the inner case 200 is housed in the outer case 100, as shown in FIG. 18A, the projection 215 is housed inside the outer case 100. Further, as shown in FIG. 17, by providing a bridging portion 212 on an opening side of a substantially U-shaped cutout 203 that is provided on the inner case 200, the inner case 200 can be increased in strength. This is made possible because this embodiment does not require a magnetic head (the magnetic head 27 shown in FIGS. 12A and 12B), and thus it is no longer necessary to consider interference with the magnetic head.

In the optical disk 300, it is essential that an attracting plate 302 is provided in a center portion.

The disk cartridge according to this embodiment has the same configuration as that of the disk cartridge according to Embodiment 1 except for the difference mentioned above. In the following description, like reference numerals denote like members having the same functions as those described with regard to Embodiment 1, for which descriptions do not go into details.

Figure 18B:
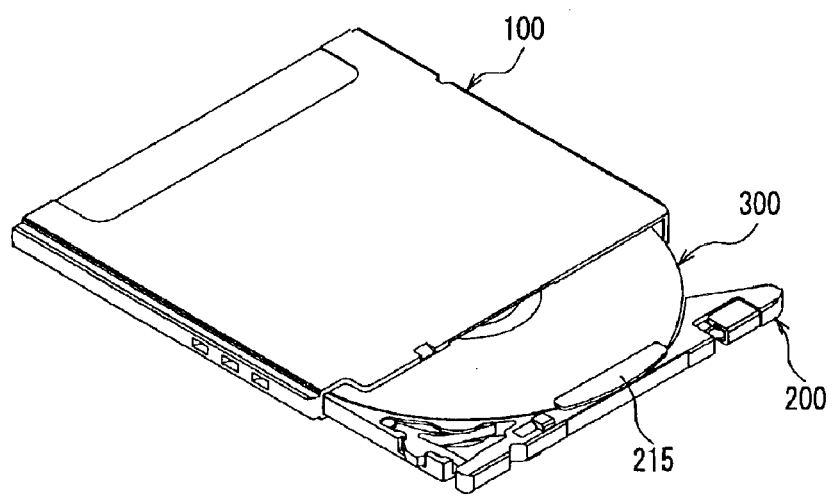
Figure 18C:
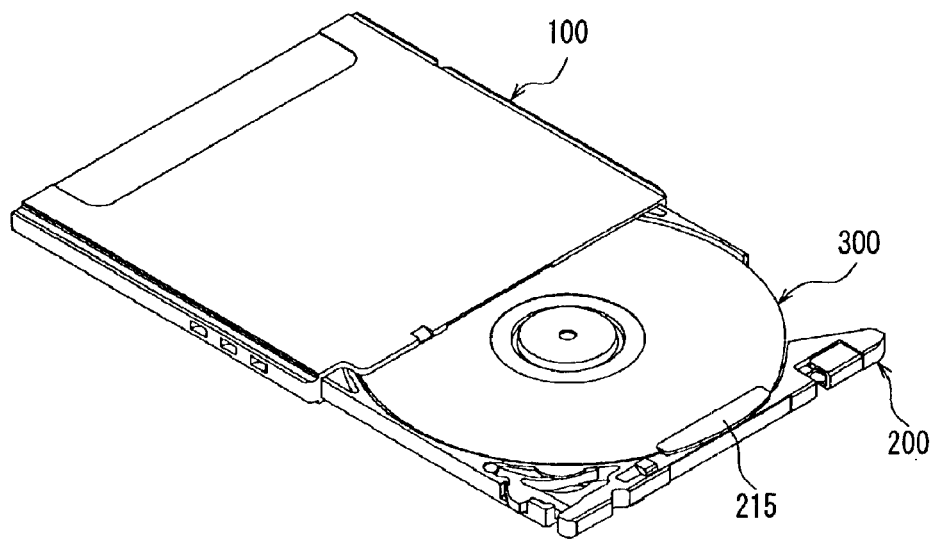
Figures 19A, 19D, 19E:
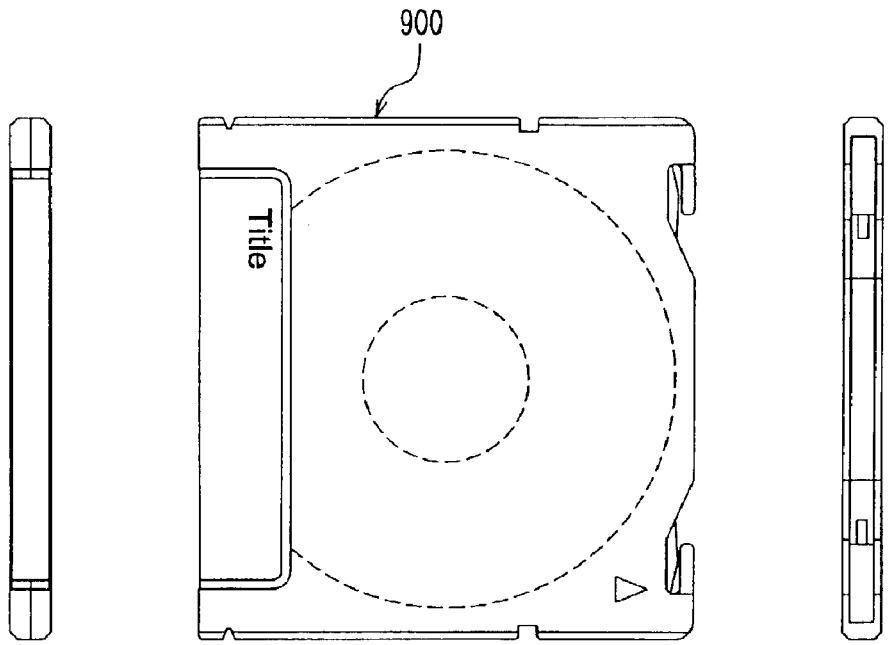
FIGS. 19A, 19B and 19C are a plan view, a side view, and a back face view, respectively.
FIGS. 19D and 19E are a side view of a rear portion and a side view of a front portion, respectively, showing an external view of a conventional disk cartridge.
Figure 19B:
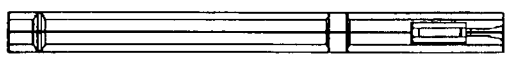
Figure 19C:
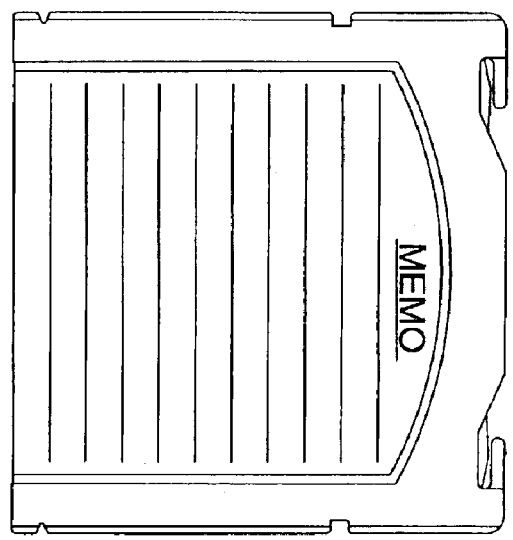
Figure 20A:
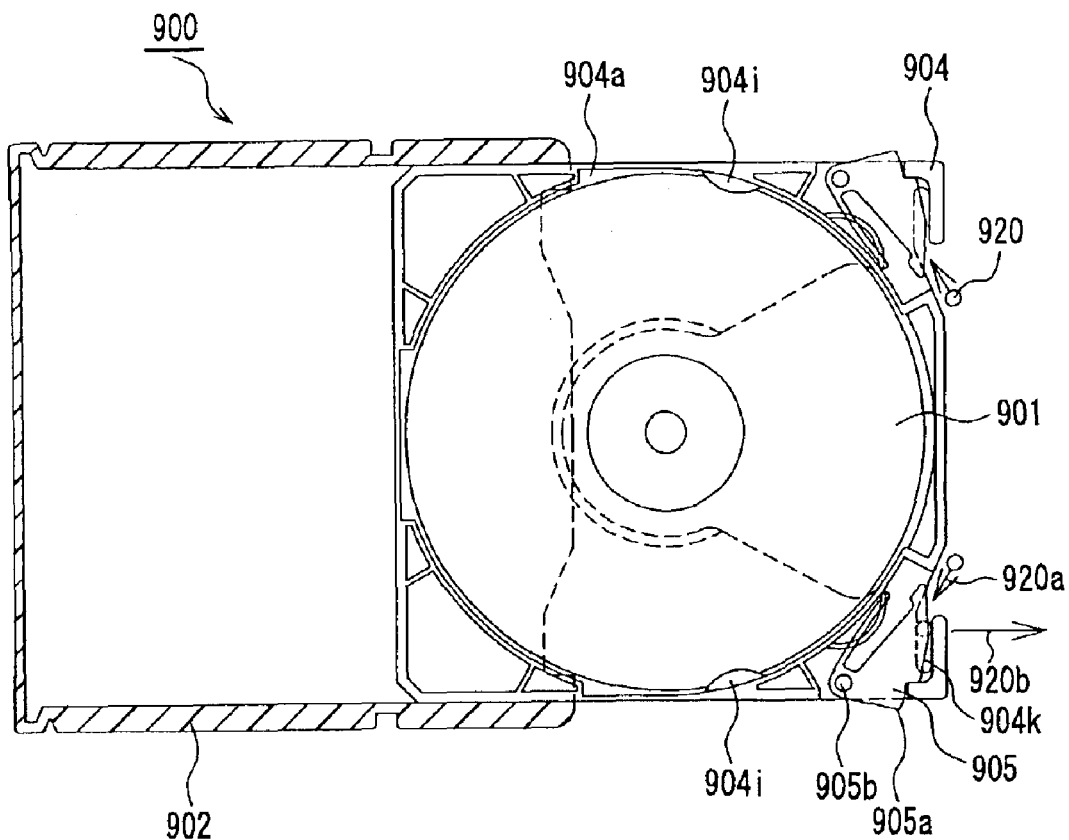
FIG. 20A is a sectional plan view showing a state in which an optical disk is pulled out together with an inner case to such a degree that recording and/or reproduction can be performed in the conventional disk cartridge shown in FIG. 19.
Figure 20B:
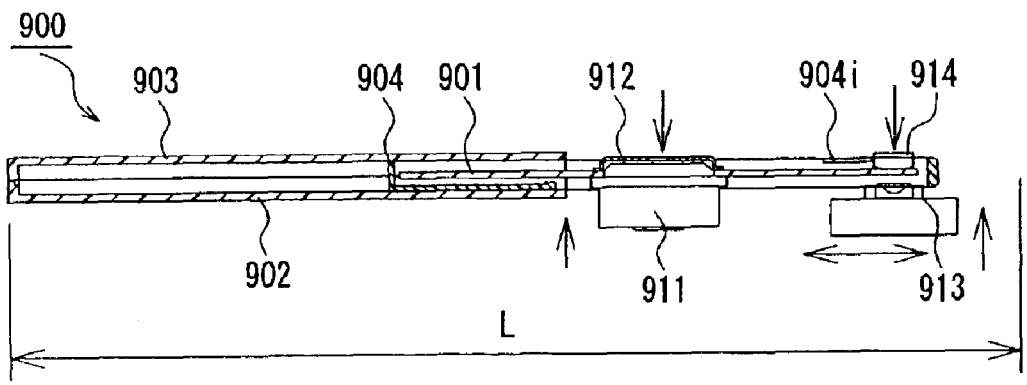
FIG. 20B is a sectional side view showing the state shown in FIG. 20A.
Figure 21:
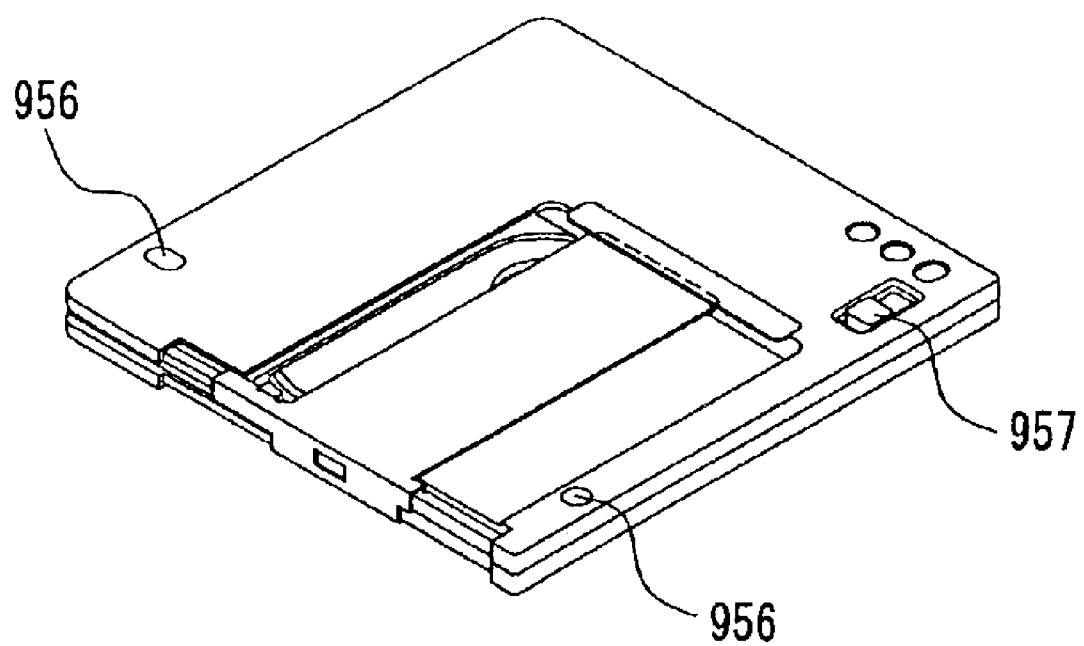
FIG. 21 is a perspective view of a disk cartridge according to another embodiment of the conventional disk cartridge.

FIG. 18 shows perspective views of the disk cartridge according to Embodiment 2 of the present invention. FIG. 18A shows a state where the inner case 200 is housed completely in the outer case 100, FIG. 18B shows a state where the inner case 200 is pulled out from the outer case 100 so that the optical disk 300 is housed in the outer case 100 by not less than half the size of the optical disk 300, and FIG. 18C shows a state where the inner case 200 is pulled out from the outer case 100 so that the optical disk 300 is exposed outside the outer case 100 by not less than half the size of the optical disk 300. As in Embodiment 1, FIG. 18B shows a pull-out state of the inner case 200 when recording and/or reproduction is performed in a single-disk drive, and FIG. 18C shows a pull-out state of the inner case 200 when recording and/or reproduction is performed in a changer drive.

According to the disk cartridge of Embodiment 2, since the substantially V-shaped cutout 104 is required to be formed only on the lower side plate 100b of the outer case 100 and not on the upper side plate 100a of the outer case 100, on the entire surface of the upper side plate 100a, patterns and characters can be provided, and a label can be attached. Thus, a disk cartridge can be configured that achieves excellent properties in terms of the appearance or practical use.

Furthermore, since the cutout 104 is not formed on the upper side plate 100a of the outer case 100, it is not necessary to provide the cover 208 (see FIG. 1) to be fitted in the cutout 104 on an upper surface of the inner case 200. As a result, the small projection 215 is used to prevent the optical disk from coming out, so that a size reduction can be achieved for this element. Thus, the inner case 200 can be formed as one body more easily, thereby achieving excellent properties from the industrial viewpoint.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

In each of Embodiments 1 and 2 described above, the substantially V-shaped cutout 104 was formed by the circular arc 102 and the straight line 103, and the substantially U-shaped cutout 203 was formed by the circular arc 201 and the two straight lines 202 parallel to each other. However, the present invention is not limited thereto. It is not necessarily required that the circular arcs 102 and 201 have the shape of a circular arc in the strict sense. Further, each of the straight lines 103 and 202 may be curved slightly, or may be a straight line to which another straight line or curve is connected. Further, the substantially V-shaped cutout 104 may be formed by, in addition to the circular arc 102 and the straight line 103 connected to one end of the circular arc 102, a straight line or curve that is connected the other end of the circular arc 102. Further, it is not necessarily required that the two straight lines 202 forming the substantially U-shaped cutout 203 be parallel to each other in the strict sense. It also is not necessarily required that the straight line 103 and the straight line 202 be parallel to each other in the strict sense, and for example, one of them may be inclined slightly with respect to the other. Further, the expressions "substantially V-shaped" and "substantially U-shaped" were used only for schematically representing the respective shapes of the cutouts. Modifications of the cutouts having the shapes described with regard to the above-mentioned embodiments are possible within the scope of the intended meaning of the present invention.

What is claimed is:

1. A disk cartridge, comprising:

a substantially box-shaped outer case that has an opening on one end face; and an inner case that is housed in the outer case such that the inner case can be pulled out from the opening and has a concave portion for an optical disk to be placed therein, wherein in an end portion on a side of the opening of each of an upper side plate and a lower side plate of the outer case, the outer case has a substantially V-shaped cutout formed by a substantially circular arc and a substantially straight line that is connected to the substantially circular arc and inclined with respect to sides of the outer case, the inner case has a substantially U-shaped cutout formed by a substantially circular arc in a central portion and two substantially straight lines virtually parallel to each other that are connected to the substantially circular arc and inclined with respect to sides of the inner case, the substantially straight line forming the substantially V-shaped cutout of the outer case and the two substantially straight lines forming the substantially U-shaped cutout of the inner case are virtually parallel to each other, and the inner case further includes a cover that is opposed to a bottom face of the concave portion and fitted in the substantially V-shaped cutout formed on the upper side plate of the outer case when the inner case is housed in the outer case.

2. The disk cartridge according to claim 1, wherein when the inner case is pulled out from the outer case so that the substantially straight line forming the substantially V-shaped cutout of the outer case substantially coincides with one of the two substantially straight lines forming the substantially U-shaped cutout of the inner case, the substantially V-shaped cutouts, the cover and the substantially U-shaped cutout form apertures, in each of which a portion of each surface of the optical disk that is placed in the concave portion of the inner case is exposed.

3. The disk cartridge according to claim 2, wherein a spindle motor and an optical head may be inserted into one or more of the apertures.

4. The disk cartridge according to claim 1, wherein a center of the substantially circular arc forming the substantially U-shaped cutout of the inner case substantially coincides with a rotation center of the optical disk that is placed in the concave portion of the inner case.

5. The disk cartridge according to claim 1, wherein the substantially circular arc forming the substantially V-shaped cutout of the outer case and the substantially circular arc forming the substantially U-shaped cutout of the inner case have a radius larger than a radius of a spindle motor for driving the optical disk to rotate.

6. The disk cartridge according to claim 1, wherein a notch for positioning the inner case in a drive is provided on a front end face of the inner case in a pull-out direction from the outer case.

7. The disk cartridge according to claim 1, wherein a write-protect identifying member is provided on a front end face of the inner case in a pull-out direction from the outer case.

8. The disk cartridge according to claim 7, wherein when the inner case is housed in the outer case, the write-protect identifying member is exposed in the substantially V-shaped cutout of the outer ease.

9. The disk cartridge according to claim 1, wherein an area on which a label is attached is provided on a surface of the cover of the inner case, and information regarding a type of the optical disk that is contained is recorded on the label in the form of a bar code.

10. The disk cartridge according to claim 1, wherein an engaging configuration for preventing the upper side plate and the lower side plate of the outer case from being separated from the inner case when the inner case is housed in the outer case is provided at a front end of the inner case in a pull-out direction from the outer case and near the opening of the outer case.

* * * * *